(12) United States Patent
Arai et al.

(10) Patent No.: US 11,165,867 B2
(45) Date of Patent: Nov. 2, 2021

(54) COMMUNICATION DEVICE AND SYSTEM

(71) Applicant: Yokogawa Electric Corporation, Musashino (JP)

(72) Inventors: Takashi Arai, Tokyo (JP); Yusaku Yoshida, Tokyo (JP); Shuichi Sato, Tokyo (JP); Hiroo Urabe, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 34 days.

(21) Appl. No.: 16/505,961

(22) Filed: Jul. 9, 2019

(65) Prior Publication Data

US 2020/0036793 A1 Jan. 30, 2020

(30) Foreign Application Priority Data

Jul. 27, 2018 (JP) .............................. JP2018-141287

(51) Int. Cl.
| | |
|---|---|
| H04L 29/08 | (2006.01) |
| H04W 4/38 | (2018.01) |
| G08B 21/18 | (2006.01) |
| H04L 12/24 | (2006.01) |

(52) U.S. Cl.
CPC ............ H04L 67/12 (2013.01); G08B 21/182 (2013.01); H04L 41/0823 (2013.01); H04W 4/38 (2018.02)

(58) Field of Classification Search
CPC ... G08B 21/182; H04L 41/0823; H04L 67/12; H04W 4/38
See application file for complete search history.

(56) References Cited

U.S. PATENT DOCUMENTS

| | | | | |
|---|---|---|---|---|
| 9,750,083 | B2* | 8/2017 | Gidlund | H04W 88/16 |
| 9,900,740 | B2* | 2/2018 | Pandian | H04W 52/0296 |
| 2008/0231466 | A1* | 9/2008 | Mazrooee | H04L 12/4625 |
| | | | | 340/853.1 |
| 2008/0259998 | A1* | 10/2008 | Venkataraman | G01K 7/01 |
| | | | | 374/170 |

(Continued)

FOREIGN PATENT DOCUMENTS

| | | | |
|---|---|---|---|
| CN | 110959141 A * | 4/2020 | ......... G05B 19/0423 |
| EP | 3432097 A1 * | 1/2019 | ............. H04L 67/12 |

(Continued)

OTHER PUBLICATIONS

Yamamoto et al., "Field Wireless Communication Module to Promote Field Wireless", Yokogawa Technical Report, English Edition, 2014, vol. 57, No. 1, pp. 3 to 6, cited in the specification (4 pages).

*Primary Examiner* — Eric Nowlin
(74) *Attorney, Agent, or Firm* — Westerman, Hattori, Daniels & Adrian, LLP

(57) ABSTRACT

A communication device includes a signal acquirer, a controller, and a wireless communicator. The signal acquirer has terminals for a plurality of types of interfaces for acquiring signals from an external field device. The controller acquires the signals output from the signal acquirer and performs control for externally transmitting digital data based on the signals using wireless communication. The wireless communicator externally transmits the digital data in accordance with a wireless communication scheme based on the control performed by the controller.

22 Claims, 16 Drawing Sheets

(56) References Cited

U.S. PATENT DOCUMENTS

| | | | |
|---|---|---|---|
| 2011/0044145 A1* | 2/2011 | Lin | G11B 20/10037 |
| | | | 369/47.51 |
| 2011/0134817 A1 | 6/2011 | Probst et al. | |
| 2012/0236768 A1 | 9/2012 | Kolavennu et al. | |
| 2013/0094447 A1* | 4/2013 | Gidlund | H04W 88/16 |
| | | | 370/328 |
| 2015/0351084 A1* | 12/2015 | Werb | H04W 12/08 |
| | | | 370/329 |
| 2016/0226550 A1 | 1/2016 | Winters et al. | |
| 2017/0059416 A1* | 3/2017 | Fujisaki | G01K 3/04 |
| 2017/0195414 A1* | 7/2017 | Hallstrom | H04L 67/1061 |
| 2018/0156766 A1* | 6/2018 | Zeng | G01N 33/004 |
| 2018/0293197 A1* | 10/2018 | Grobelny | G06F 13/4291 |
| 2019/0052638 A1* | 2/2019 | Agarwal | G07C 9/20 |
| 2019/0120677 A1* | 4/2019 | Arunachalam | G01F 15/063 |
| 2020/0135028 A1* | 4/2020 | Bakhishev | G06K 9/00771 |
| 2020/0211363 A1* | 7/2020 | Chen | H04L 47/25 |
| 2020/0278675 A1* | 9/2020 | Balathandapani | G05D 1/12 |

FOREIGN PATENT DOCUMENTS

| | | | | |
|---|---|---|---|---|
| EP | 3625627 A1 * | 3/2020 | | H04L 67/12 |
| WO | WO-2012014008 A1 * | 2/2012 | | G06Q 10/06 |
| WO | WO-2019016003 A1 * | 1/2019 | | G05B 19/0423 |
| WO | WO-2019055023 A1 * | 3/2019 | | H04W 4/021 |

\* cited by examiner

FIG. 17

| | COMMUNICATION DEVICE SETTING SCREEN | | |
|---|---|---|---|
| COMMUNICATION DEVICE IDENTIFICATION INFORMATION | P001R234D456 | | |
| | TYPE | RANGE | |
| CHANNEL 1 | TEMPERATURE ▽ | -20 | 80 |
| CHANNEL 2 | PRESSURE ▽ | 0 | 1,000,000 |
| CHANNEL 3 | FLOW RATE ▽ | 0 | 1,000 |

COMMUNICATION DEVICE AND SYSTEM

BACKGROUND

Technical Fields

The present invention relates to a communication device and a system.

Priority is claimed on Japanese Patent Application No. 2018-141287, filed on Jul. 27, 2018, the contents of which are incorporated herein by reference.

Related Art

For example, even in a large-scale plant facility and the like, it is necessary to detect or measure a state and the like of the facility using a sensor provided in each place, and to quickly collect data acquired by the sensor. In the future, it is expected that a wide variety of data will be collected more finely using more sensors than before, the accuracy of control of plant facilities and the like will be further improved using the data, and the quality of control will be advanced. At that time, a process of performing data collection using wireless communication is effective to increase the flexibility of construction of a communication network within the plant facility and to reduce the cost of cable wiring and the like.

Yamamoto Shuji, Inagaki Trtsuro, Toda Hideyuki, Kitano Kinichi, and Mochizuki Satoshi, "Field Wireless Communication Module to Promote Field Wireless", Yokogawa Electric Corporation, Yokogawa Technical Report, Vol. 57, No. 1, 2014, pp. 3-6 describes a wireless communication module (FN110) for enabling various types of field devices to be used as wireless field devices.

The wireless communication module described in the "Field Wireless Communication Module to Promote Field Wireless" performs communication using an industrial wireless standard ISA 100.11 a. ISA 100.11a is a standard standardized by the ISA 100 committee of the International Society of Automation. In communication based on ISA 100.11a, IEEE 802.15.4-2006 2.4 GHz digital spread spectrum (DSS) is used in a physical layer. IEEE 802.15.4-2006 2.4 GHz DSS is also used in a physical layer in industrial communication based on other standards (for example, a wireless highway addressable remote transducer (HART)).

In industrial wireless communication products according to the above-described conventional technology, frequencies in a 2.4 GHz band are also used and there is a problem in that an arrival distance of wireless communication is limited. That is, when a communication network is intended to be constructed in a large-scale plant reaching a range of, for example, several kilometers in all directions, using the conventional technology, it is necessary to provide a large number of wireless access points. Also, it is necessary to construct a network for establishing connection between the access points using a relay device or the like.

In order to construct an industrial wireless communication network at a lower cost and efficiently collect data for capturing various events in a large-scale plant or the like, it is desirable to perform wireless communication of a longer arrival distance. Also, at the same time, it is desirable to use a wide variety of field device product groups (such as sensors) that have been conventionally used as wireless field devices in a simple method. Furthermore, it is desirable to flexibly construct a communication network by appropriately selecting a protocol suitable for the purpose or the like from among various communication protocols.

SUMMARY

There is provided a communication device, which may include a signal acquirer having terminals for a plurality of types of interfaces for acquiring signals from an external field device, a controller configured to acquire the signals output from the signal acquirer, and configured to perform control for externally transmitting digital data based on the signals using wireless communication, a wireless communicator configured to externally transmit the digital data in accordance with a wireless communication scheme based on the control performed by the controller, a signal acquisition board having a function of the signal acquirer, a control board having a function of the controller, and a wireless communication board having a function of the wireless communicator.

Further features and aspects of the present disclosure will become apparent from the following detailed description of exemplary embodiments with reference to the attached drawings.

BRIEF DESCRIPTION OF THE DRAWINGS

FIG. 17 is a schematic diagram showing an example of a configuration of a communication device setting screen displayed on a display device provided in a terminal device in the system according to the third embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention enables field devices and the like, which have no wireless communication function, to perform a wide variety of wireless communication including that over a long distance. Thus, the aspect of the present invention is to provide a communication device and a system that make it possible to construct a wireless communication network flexibly and at a low cost.

First Embodiment

A first embodiment of the present invention will be described with reference to the drawings. Also, in the present embodiment, a field device is, for example, a device such as a sensor such as a flowmeter, a thermometer, a hygrometer, or a pressure gauge, a valve, a pump, or an actuator.

Figure 1:
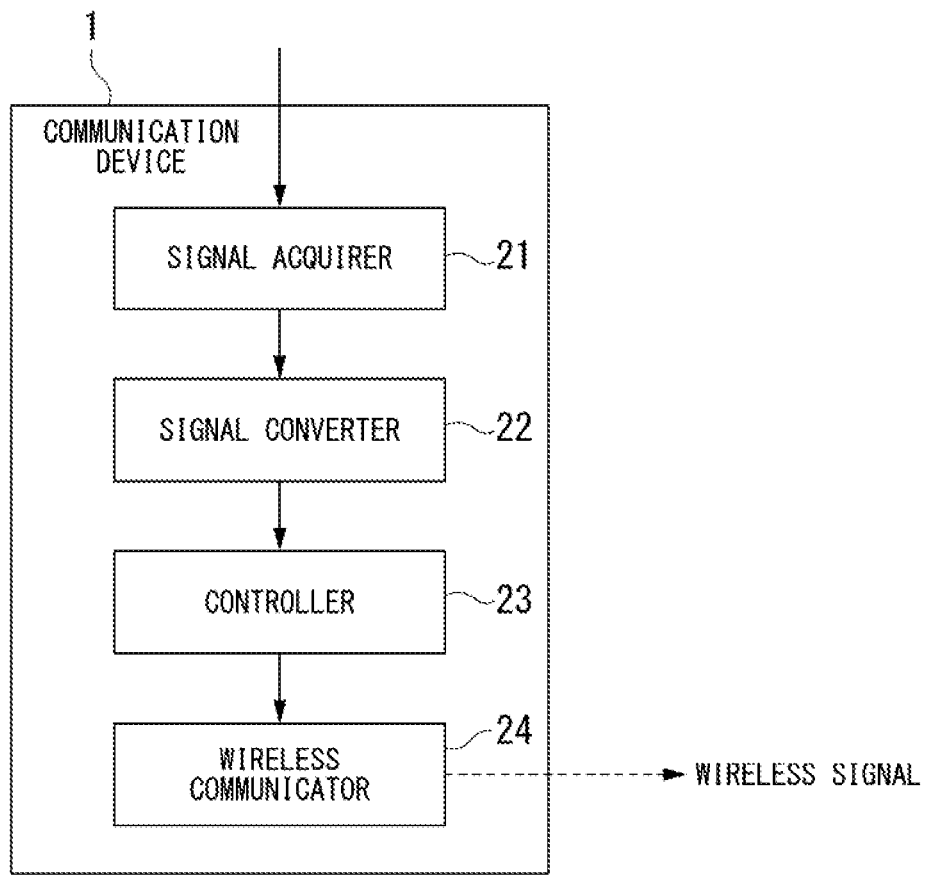
FIG. 1 is a functional block diagram showing a functional configuration of a communication device according to a first embodiment of the present invention.

FIG. 1 is a functional block diagram showing a functional configuration of a communication device according to the present embodiment. As illustrated, a communication device 1 includes a signal acquirer 21, a signal converter 22, a controller 23, and a wireless communicator 24.

The signal acquirer 21 acquires a signal from the outside. The signal acquirer 21 includes, for example, terminals for many types of interfaces for acquiring signals output from an external field device. The signals acquired by the signal acquirer 21 are typically electrical signals. For example, the signal acquirer 21 acquires a signal from the outside via an interface such as a highway addressable remote transducer (HART), a signal of a voltage of 1 to 5 volts (V), a signal of a current of 4 to 20 milliamperes (mA), a universal asynchronous receiver-transmitter (UART), a digital input/output (DIO), an inter-integrated circuit (I2C), or a serial peripheral interface (SPI). Also, the interfaces listed here are among existing technology and are widely used. The type of interface used when the signal acquirer 21 acquires a signal is not limited to those exemplified above.

The signal acquirer 21 supplies the acquired signal to the signal converter 22 via a signal line between the signal acquirer 21 and the signal converter 22.

The signal converter 22 converts the signal acquired by the signal acquirer 21 into a prescribed type and outputs the converted signal. For example, the signal converter 22 performs conversion for a communication scheme such as the HART or a broadcast rapid access intelligent network (BRAIN). Also, BRAIN communication is a communication scheme in conformity with a standard of Yokogawa Electric Corporation. That is, the signal converter 22 converts the signal output from the signal acquirer 21 into a digital signal of a type in conformity with a prescribed communication standard, and outputs the digital signal.

Also, the signal converter 22 may be configured as a module that can be replaced according to the communication standard. For example, the signal converter 22 for the HART, the signal converter 22 for the BRAIN, or the like is provided as a replaceable module and therefore a user of the communication device 1 can perform conversion into various types of digital signals simply by replacing the module of the signal converter 22.

The signal converter 22 can also include a means/method for performing communication addressed to a control board (the controller 23) such as analog-to-digital (AD) conversion. The signal converter 22 may use any element as an element capable of transmitting a digital signal to the controller 23, without being limited to the AD conversion element.

Also, the signal converter 22 may have a function of forming isolation between an incoming signal to the signal acquirer 21 and the controller 23 in consideration of a case in which a cable length is long, a case in which an influence of external noise is desired to be minimized, or a case in which an influence of a sensor failure is to be minimized. However, this isolation function may be provided if necessary and the isolation function may be omitted if not necessary. Also, the signal conversion element provided in the signal converter 22 is connected to the controller 23 according to universal serial communication or the like. Thus, even if a configuration of a part of the signal conversion element is changed, a design is made such that no design change in the controller 23 occurs. The universal serial communication is, for example, a communication scheme such as an I2C, a UART, or an SPI. In relation to the signal converter 22, a power supply may be disposed on its board (a signal conversion board) so that it has an advanced measurement function.

Also, the controller 23 may control the power supply. It is also possible to provide a function capable of suppressing power consumption by the controller 23 controlling the power supply.

The controller 23 performs various processes based on a signal transferred from the signal converter 22 according to the above-described communication scheme. Also, the controller 23 controls the wireless communicator 24 to perform control for externally transmitting data received from the signal converter 22 in a prescribed type. That is, the controller 23 acquires the signal output from the signal acquirer 21 (including the case in which it is the type converted by the signal converter 22), and performs control for externally transmitting digital data based on the signal using the wireless communicator 24.

Details of the function provided in the controller 23 will be further described below with reference to FIG. 3.

The wireless communicator 24 transmits and receives data (digital data) according to a wireless signal based on control from the controller 23.

For example, the wireless communicator 24 externally transmits the data transferred from the controller 23 at a prescribed timing. A communication partner with which the wireless communicator 24 communicates is, for example, a server device that collects data measured by a field device or the like. Also, the wireless communicator 24 appropriately communicates with the communication partner via a gateway device. Also, the server device may be a device configured as a cloud system.

Also, the wireless communicator 24 receives data from an external server device or the like. Details of this data are, for example, a command, setting information, and the like for the communication device 1.

For example, if it is necessary to operate the communication device 1 or the sensor with a battery for a long time, a scheme such as polling for downloading setting values when the communication device 1 has accessed the server device is desirable. Thereby, the communication device 1 can prevent a battery capacity from being consumed during a standby time for waiting for a signal from a server. That is, power saving can be achieved. However, this scheme has a problem in that the setting values can be downloaded only at the time of accessing the server device from the communication device 1 side. Consequently for example, it is desirable to provide a configuration in which a switch is provided at a touched portion of the communication device 1 (for example, on the upper surface of the signal acquirer 21 or the like) and the server device is forcibly accessed from the communication device 1 side by changing the state of the switch. Furthermore, instead of the above-described switch, the communication device 1 may have a function of establishing a connection to the local area network to construct a mechanism for forcibly accessing the communication device 1 side from the local area network.

The wireless communicator 24 performs communication according to, for example, a low power wide area (LPWA) scheme. The LPWA wireless communication scheme is characterized in implementing communication over a long distance (for example, several kilometers) with low power consumption. On the other hand, in the LPWA wireless communication scheme, a communication rate (an amount of information to be communicated per unit time) is comparatively low. In the LPWA wireless communication scheme, communication using wireless signals in a sub-gigahertz band is performed. The wireless communicator 24 can use a long range wide area network (LoRaWAN) as one of the standards for implementing the LPWA wireless communication scheme. A communication distance according to the LoRaWAN standard is about 20 kilometers (km) at most. However, the communication distance may be reduced to several kilometers in accordance with the output power during transmission and the transmission/reception environment. Also, an amount of data transmission in LoRaWAN is, for example, about a dozen bytes per communication.

The wireless communicator 24 may be configured to perform communication in a wireless communication scheme using a narrowband Long Term Evolution (LTE) standard instead of the above-described LoRaWAN. The narrowband LTE standard is, for example, a standard of LTE Cat.0, LTE Cat.M1, or LTE Cat.NB1 (NB-IoT). These standards use a narrower frequency band and a lower communication rate than the LTE standard used in smartphones and the like. Specifically, a frequency bandwidth used in the narrowband LTE communication scheme is, for example, 200 kHz or less. Furthermore, as an example, the NB-IoT scheme uses a 180 kHz frequency bandwidth. In other words, these standards are LTE standards for Internet of Things (IoT).

As described above, the wireless communicator 24 performs communication using the LoRaWAN or the narrowband LTE standard. Therefore, long distance communication with low power consumption is possible. Here, the wireless communicator 24 may perform communication using another wireless scheme such as WiFi or Bluetooth.

The communication device 1 described above with reference to FIG. 1 can be designed as a device with low power consumption as a whole. Also, it is possible to drive the entire communication device 1 with a battery by employing a small-sized and large-capacity battery. Also, the communication device 1 can be configured to be continuously operated without replacing the battery for several years.

Next, an example of a communication device in which some functions are omitted will be described.

Figure 2:
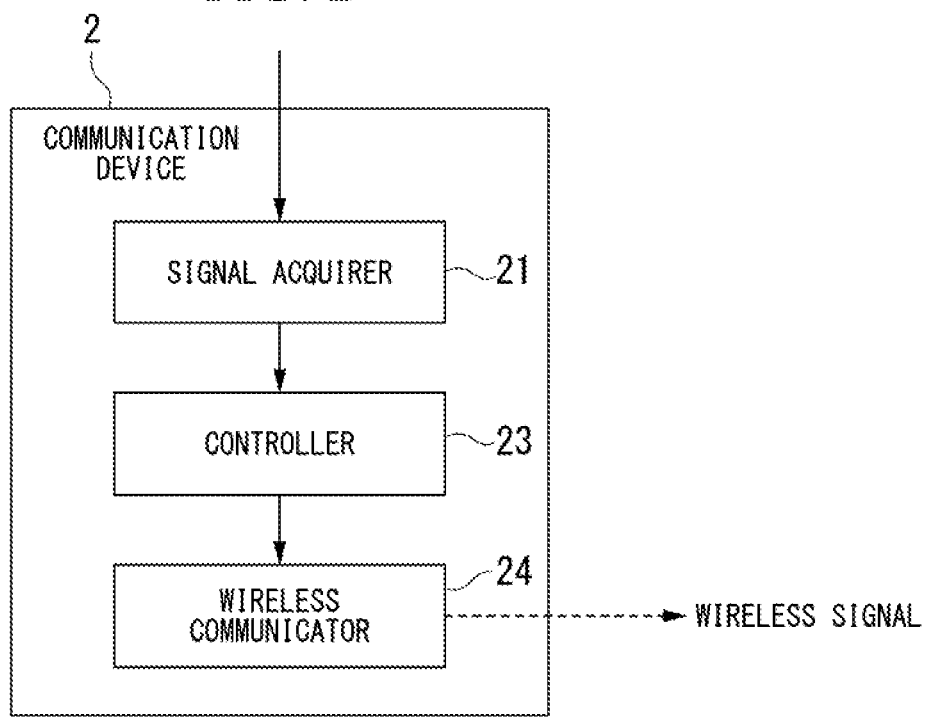
FIG. 2 is a functional block diagram showing a functional configuration when some functions of the communication device according to the first embodiment are omitted.

FIG. 2 is a functional block diagram showing a functional configuration of the communication device in which some functions are omitted. As illustrated, a communication device 2 includes a signal acquirer 21, a controller 23, and a wireless communicator 24. That is, the communication device 2 has a function in which the function of the signal converter 22 is excluded from the functional configuration of the communication device 1. The functions of the signal acquirer 21, the controller 23, and the wireless communicator 24 in the communication device 2 are similar to the functions of the signal acquirer 21, the controller 23, and the wireless communicator 24 in the communication device 1 described above. However, in the communication device 2, the signal acquirer 21 transfers an acquired signal directly to the controller 23 instead of the signal converter 22. Also, the controller 23 receives a signal directly from the signal acquirer 21, not from the signal converter 22. In other words, in the communication device 2, signal conversion by the signal converter 22 is not performed. That is, in the communication device 2, the controller 23 acquires a type of signal (analog signal or digital signal) acquired from the outside by the signal acquirer 21 as it is. Such a configuration of the communication device 2 is useful for applications that do not require advanced data transmission functions such as the HART and high-resolution AD conversion. The communication device 2 can implement a smaller size and lower power consumption than the communication device 1 configured with four boards. However, this configuration of the controller 23 does not mean that a signal from the interface such as the HART, the voltage of 1 to 5 V, the current of 4 to 20 mA, the UART, the DIO, the I2C, or the SPI described above is not directly received. The controller 23 takes in the signal received from the signal acquirer 21 and processes the received signal.

Also, in the following description, if possible, the communication device 1 may be appropriately replaced with the communication device 2.

Figure 3:
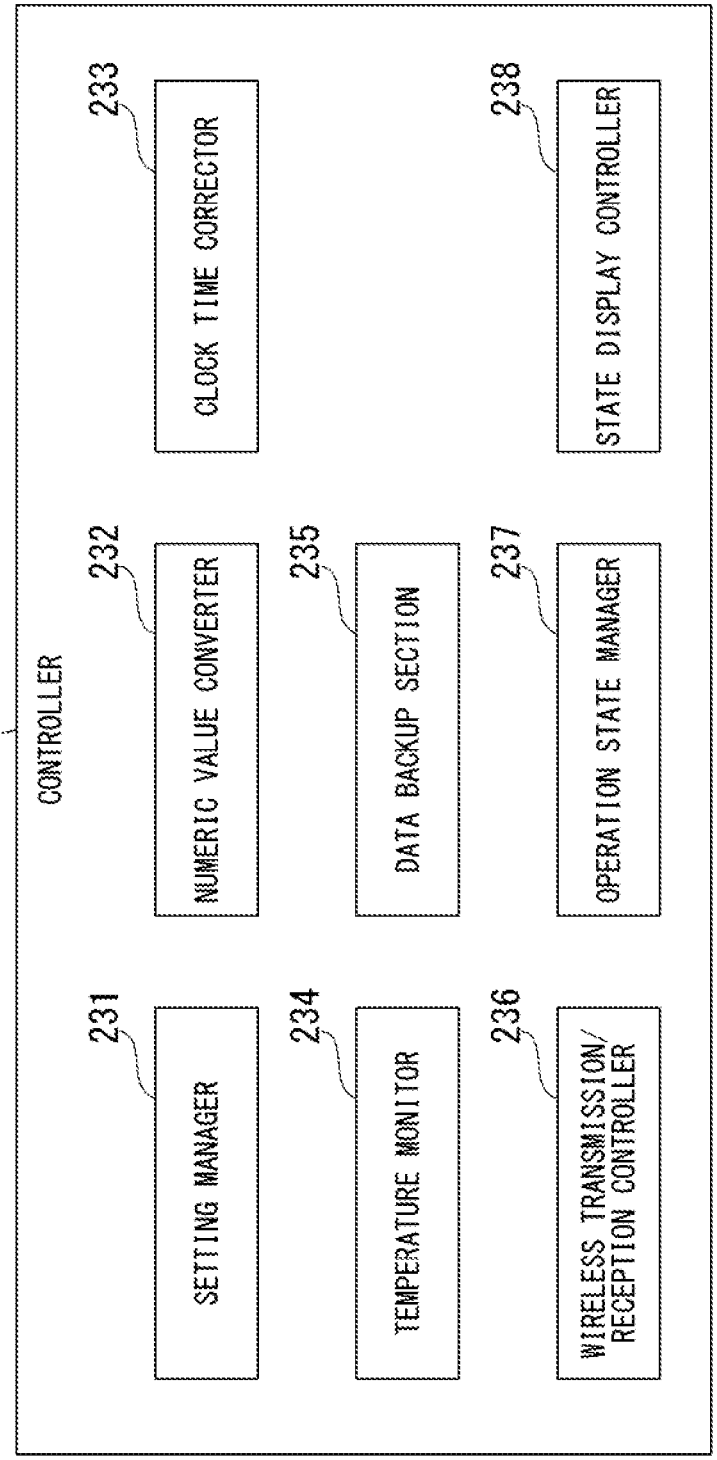
FIG. 3 is a block diagram showing a more detailed functional configuration of a controller provided in the communication device according to the first embodiment.

FIG. 3 is a block diagram showing a more detailed functional configuration of the controller 23 described in FIG. 1 or 2. As illustrated, the controller 23 includes a setting manager 231, a numeric value converter 232, a clock time corrector 233, a temperature monitor 234, a data backup section 235, a wireless transmission/reception controller 236, an operation state manager 237, and a state display controller 238.

The setting manager 231 manages setting information of the communication device 1. The setting manager 231 changes the setting information in accordance with, for example, an external instruction or the like. The setting information includes information for a numeric value conversion process of the numeric value converter 232.

The numeric value converter 232 performs a process of converting a signal (a voltage signal, a current signal, a digital signal, or the like) acquired by the signal acquirer 21 into a numeric value representing a physical quantity. In other words, the numeric value converter 232 converts the acquired signal into digital data of a prescribed numeric value range. The setting related to the conversion of the numeric value (the range of the numeric value to be output or the like) is managed by the above-described setting manager 231. A user interface related to the setting of a numeric value is also shown in FIG. 17 (a third embodiment). When the numeric value converter 232 performs the conversion of a numeric value range or the like, the controller 23 performs control so that the converted data is externally transmitted wirelessly.

The clock time corrector 233 corrects a clock time of a clock held by the communication device 1. Specifically, the clock time corrector 233 corrects the clock time based on, for example, a received GPS signal. Also, the function of acquiring the GPS signal may be incorporated within the wireless communicator 24. Also, the clock time corrector 233 may be implemented by receiving a signal representing the clock time using a module such as a radio wave clock.

Also, "GPS" is an abbreviation for the Global Positioning System.

The temperature monitor 234 monitors whether or not a temperature measured by a temperature measurement means (a temperature measurer 2306 shown in FIG. 4 which will be described later) provided in the communication device 1 is in a range of normal values. When the temperature is out of the range of normal values, the temperature monitor 234 externally transmits a warning signal. According to this function of the temperature monitor 234, for example, it is possible to externally give a warning of a situation of an abnormal temperature caused by an abnormal operation of the communication device 1 or the like.

The data backup section 235 backs up data received by the communication device 1 from the field device and manages the backup data. The communication device 1 periodically externally transmits data received from the field device as a wireless signal (for example, to an external data collection server device or the like), and also stores data inside the communication device 1 for the case of a communication abnormality or data loss due to some abnormality. The data backup section 235 writes and stores data to be backed up in, for example, a nonvolatile semiconductor memory or volatile memory (storage) within the communication device 1.

That is, the data backup section 235 has a function of writing a backup of digital data in a storage for storing the backup of digital data to be externally transmitted using wireless communication and managing the backup. Here, the management of the backup includes, for example, the management of a clock time associated with data, the management of whether or not data has been externally transmitted, the management of whether or not data has been received normally by an external device, and the like.

The wireless transmission/reception controller 236 controls the transmission and reception of wireless signals by the wireless communicator 24.

The operation state manager 237 manages an operation state of the communication device 1 and outputs a signal indicating the operation state.

The state display controller 238 controls state display using a display 2307 to be described below. For example, when the display 2307 is configured using a light emitting diode (LED), the state display controller 238 controls an on/off state of the LED or controls a display color of the LED. The state display controller 238 controls display in accordance with, for example, a signal output from the operation state manager 237. Also, the state display controller 238 controls display in accordance with a signal (for example, indicating whether a temperature is normal/abnormal) output by the temperature monitor 234. Also, because comparatively great electric power is consumed when the LED is turned on, it is desirable to provide, for example, a function of providing a switch or the like and displaying a state only when the switch is pressed down. Also, the above-described switch used for forcibly establishing the connection to the server device and the above-described switch for the LED turning-on display may be shared. In this case, it is possible to use one switch for a plurality of purposes by changing its control according to, for example, a long press, a short press, and the like. That is, the number of switches to be used can be reduced.

Figure 4:
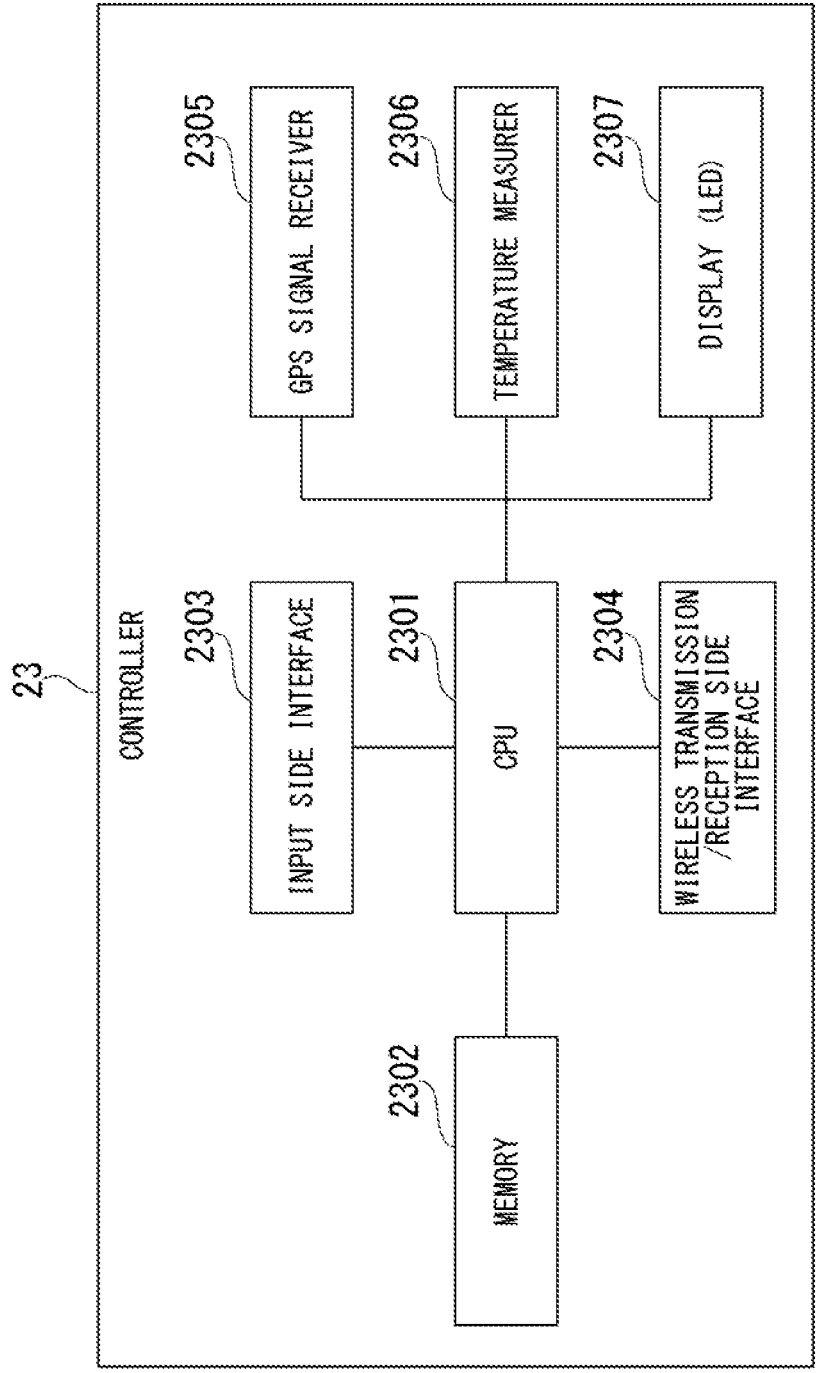
FIG. 4 is a schematic view showing an example of a hardware configuration of the controller provided in the communication device according to the first embodiment.

FIG. 4 is a schematic diagram showing an example of a hardware configuration of the controller 23 described above. As illustrated, the controller 23 includes a central processing unit (CPU) 2301, a memory 2302, an input side interface 2303, a wireless transmission/reception side interface 2304, a GPS signal receiver 2305, a temperature measurer 2306, and the display 2307.

The CPU 2301 executes a program stored in the memory 2302. Also, as a result of executing the program, the CPU 2301 performs an input/output operation and the like relative to a peripheral device and the like.

The memory 2302 (a storage) stores data, programs, and the like. The memory 2302 includes an area for the data backup section 235 to store and save backup data.

The input side interface 2303 has an interface circuit for exchanging signals with the signal converter 22 (the signal acquirer 21 when there is no signal converter 22).

The wireless transmission/reception side interface 2304 has an interface circuit for exchanging signals with the wireless communicator 24 and the like.

The GPS signal receiver 2305 is a device having a function of receiving a GPS signal transmitted from a GPS satellite. The controller 23 can obtain a coordinate value of a current position of the communication device 1, or obtain a current clock time, based on the GPS signal received by the OPS signal receiver 2305. The current clock time obtained from the GPS signal is used, for example, for clock time correction by the clock time corrector 233 described above.

The temperature measurer 2306 is a device having a function of a thermometer. The temperature measurer 2306 measures the temperature of a portion (for example, on a printed circuit board) where the controller 23 is provided, and supplies a signal representing a temperature measurement value to the CPU 2301. Thereby, the CPU 2301 can periodically determine whether or not a temperature abnormality has occurred in the portion where the controller 23 is provided.

The display 2307 is implemented using an LED or the like and displays the state of the communication device 1. The display 2307 is controlled by a control signal from the CPU 2301. The display 2307 can turn on or off, or blink the LED of each display color (for example, red, green, blue, white, or the like) based on the control signal. However, although on or off of these LEDs is controlled by a control signal from the CPU, the LEDs may be placed on another board on which the CPU is not provided. Also, a device for causing the LED to be turned on or blinked only when the switch is operated to reduce the power consumption of the LED is possible.

Next, an example of the structure of the communication device 1 will be described.

FIGS. 5, 6, 7, 8, 9, and 10 are orthographic views of the communication device 1 (a configuration example) viewed in six directions.

Figure 5:
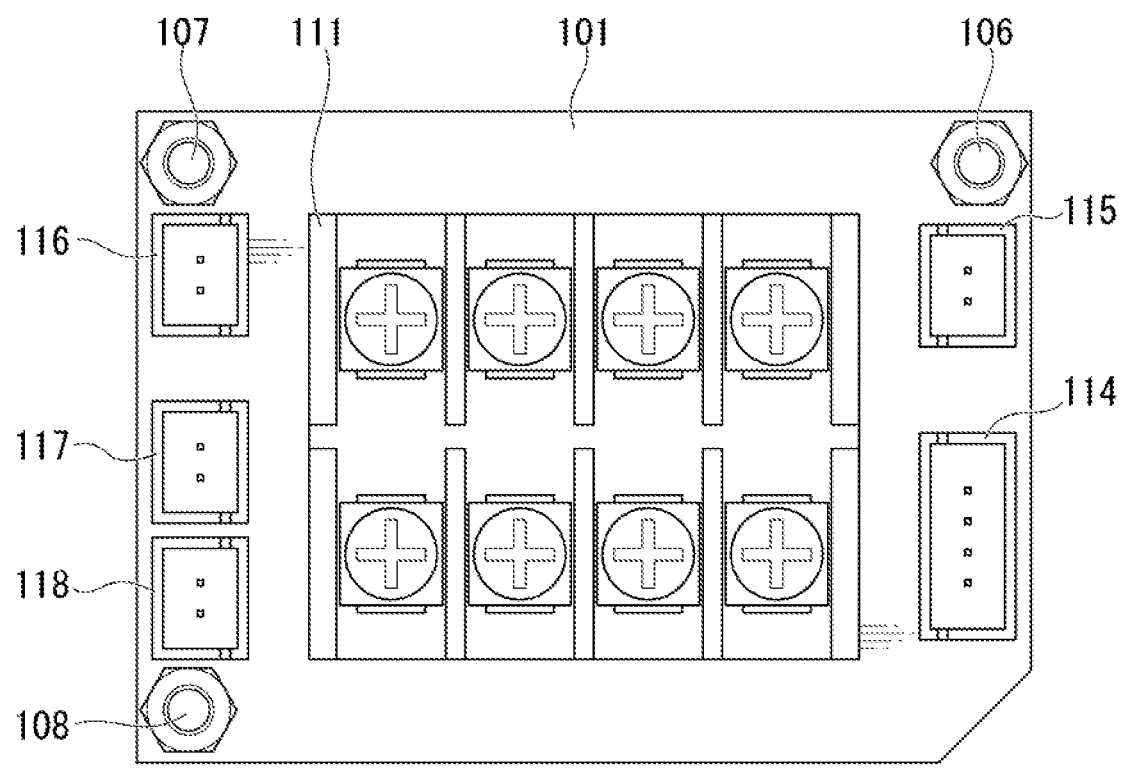
FIG. 5 is a plan view of the communication device according to the first embodiment when viewed from above.

FIG. 5 is a plan view of the communication device 1 when viewed from above. The lower side in FIG. 5 is a front side of the communication device 1 and the upper side therein is a rear side of the communication device 1.

Figure 6:
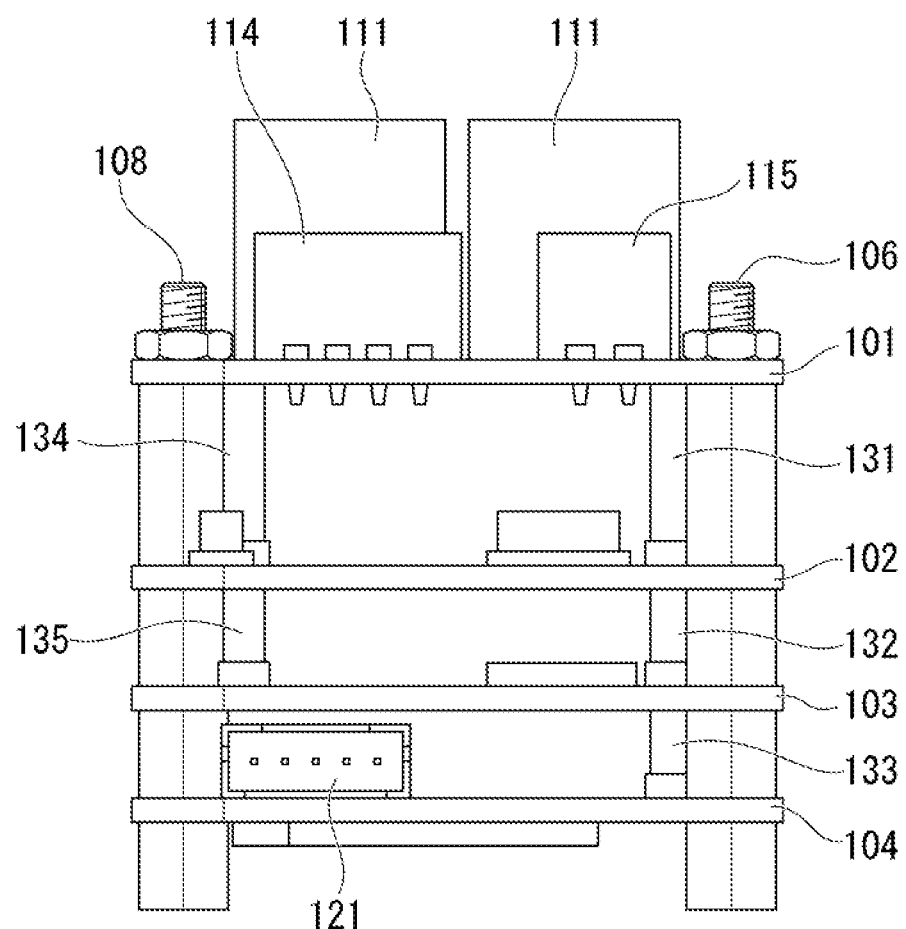
FIG. 6 is a side view (a right side view) of the communication device according to the first embodiment when viewed from a right side.

FIG. 6 is a side view (a right side view) of the communication device 1 when viewed from a right side.

Figure 7:
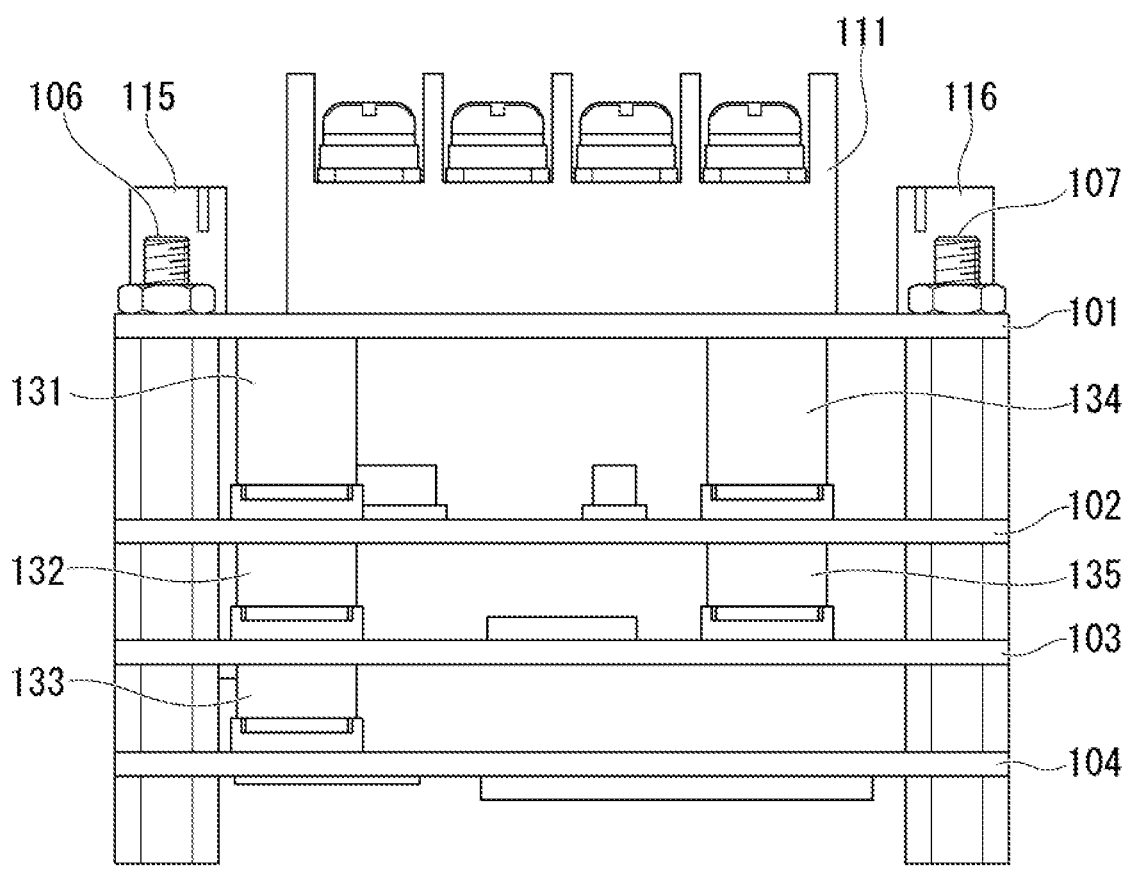
FIG. 7 is a rear view of the communication device according to the first embodiment when viewed from a rear side.

FIG. 7 is a rear view of the communication device 1 when viewed from a rear side.

Figure 8:
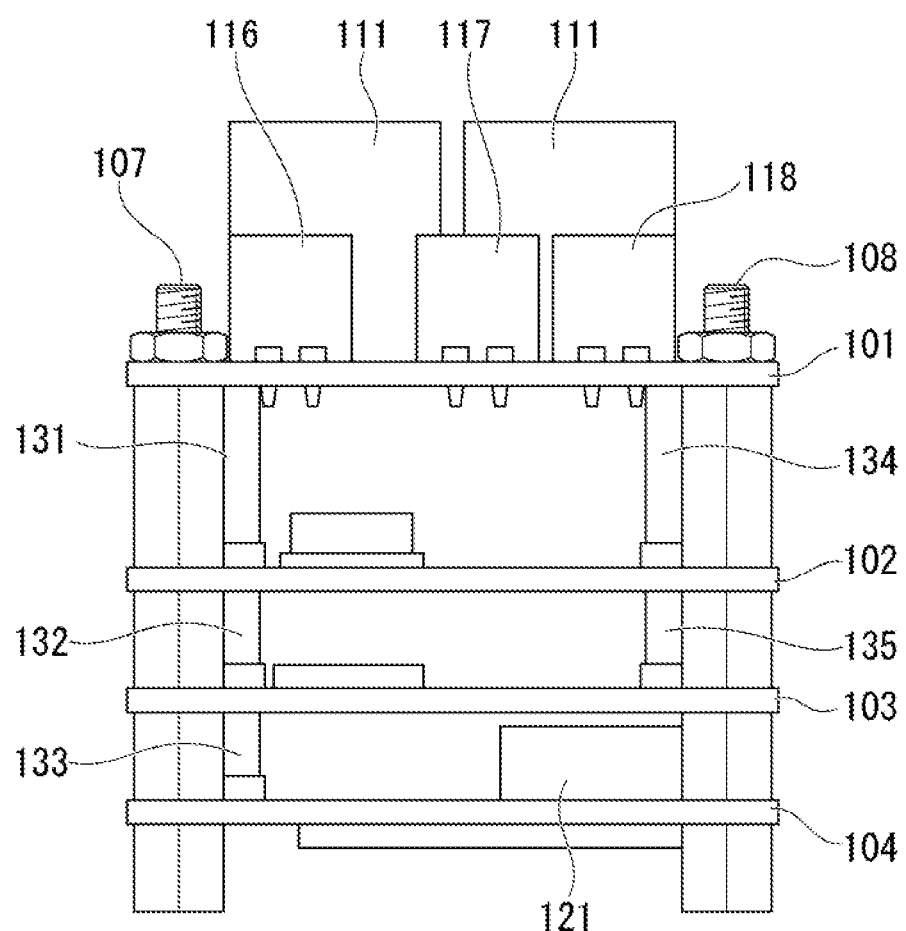
FIG. 8 is a side view (a left side view) of the communication device according to the first embodiment when viewed from a left side.

FIG. 8 is a side view (a left side view) of the communication device 1 when viewed from a left side.

Figure 9:
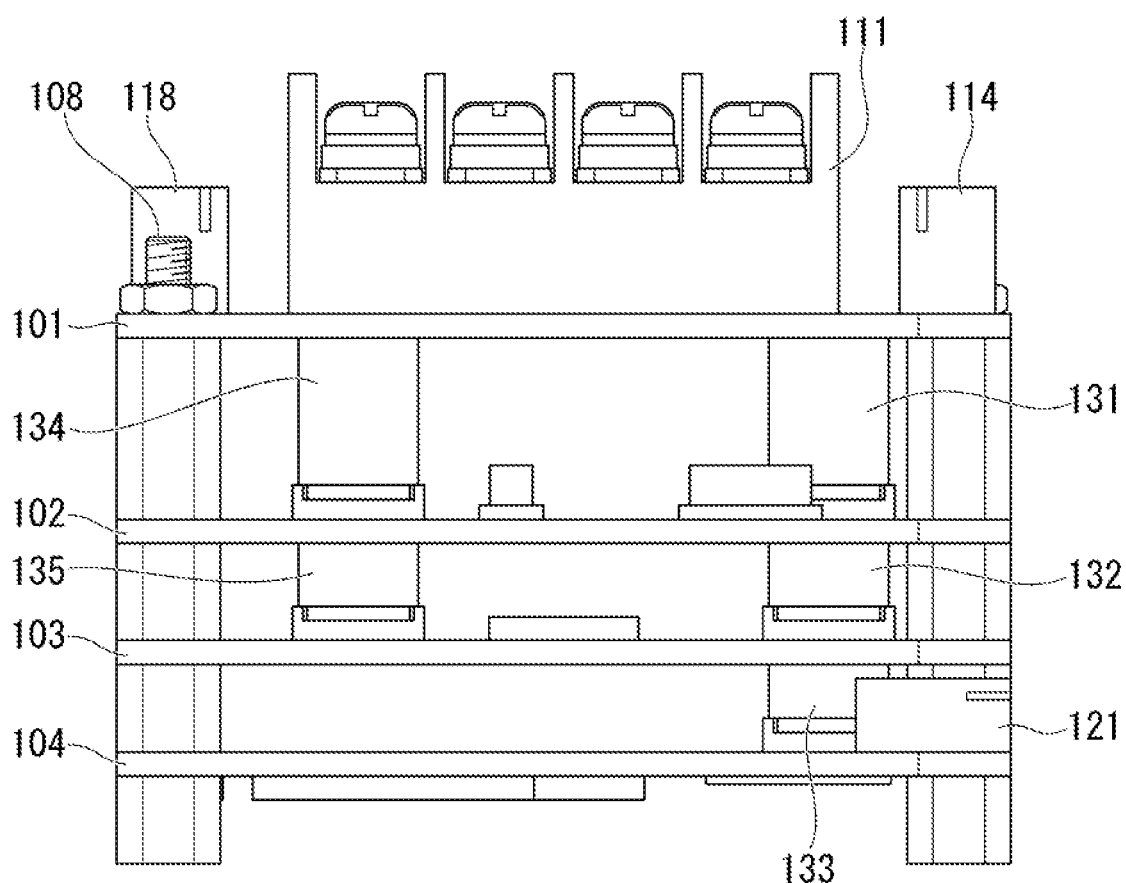
FIG. 9 is a front view of the communication device according to the first embodiment when viewed from a front side.

FIG. 9 is a front view of the communication device 1 when viewed from a front side.

Figure 10:
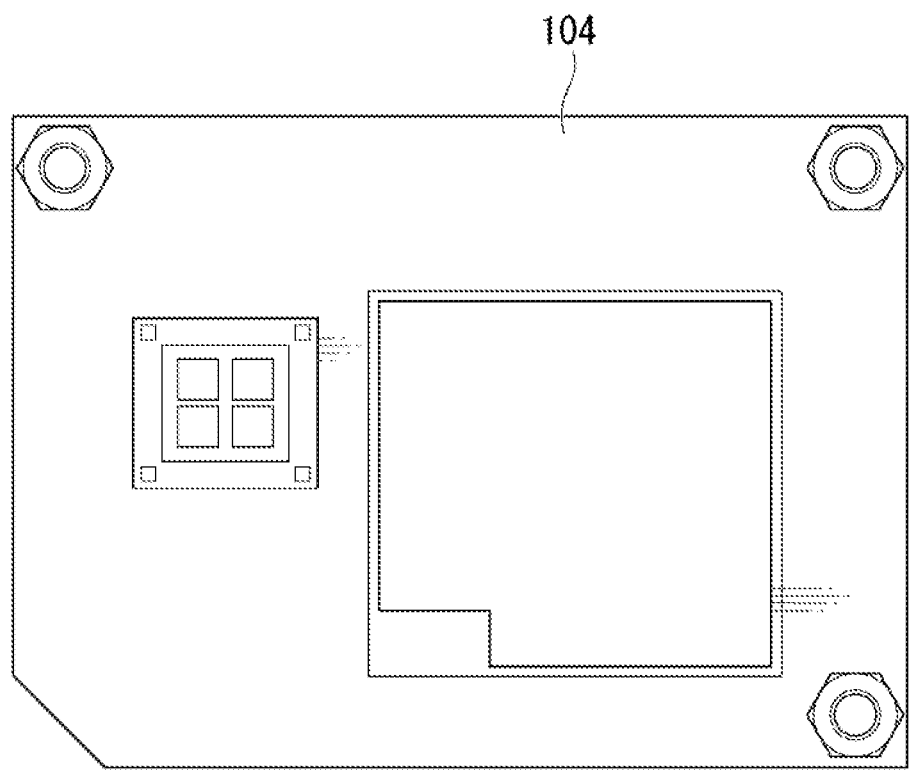
FIG. 10 is a bottom view of the communication device according to the first embodiment when viewed from below.

FIG. 10 is a bottom view of the communication device 1 when viewed from below.

As shown in these drawings, the communication device 1 is configured by stacking four boards (bases) in a layer shape. The four boards are, in order from the top, a signal acquisition board 101 (also referred to as a "terminal block board"), a signal conversion board 102 (also referred to as an "HART communication board" when HART communication is performed), a control board 103 (also referred to as a "CPU board") and a wireless communication board 104 (also referred to as a "communication board"). That is, these boards are stacked in the above-described order. The signal acquisition board 101, the signal conversion board 102, the control board 103, and the wireless communication board 104 are configured to implement the signal acquirer 21, the signal converter 22, the controller 23, and the wireless communicator 24 shown in FIG. 1, respectively.

Also, when the communication device 2 is used instead of the communication device 1, the communication device 2 is obtained by stacking three boards of the signal acquisition board 101, the control board 103, and the wireless communication board 104 instead of the above.

As shown in the plan view of FIG. 5, a terminal block 11 and connectors 114, 115, 116, 117, and 118 are disposed on the upper surface (the front surface) of the signal acquisition board 101. The terminal block 111 has a total of eight terminals of 2 terminals in a longitudinal direction×4 terminals in a lateral direction. Each of these eight terminals is made of a metal and provided with a screw. A signal line can be connected to each terminal. Also, the terminal block 111 itself is made of a synthetic resin. Each of the connectors 114, 115, 116, 117, and 118 has a synthetic resin cover and a metal terminal. The connector 114 is a four-terminal connector. Each of the connectors 115, 116, 117, and 118 is a two-terminal connector. Each of bolts 106, 107, 108 passes through the signal acquisition board 101, the signal conversion board 102, the control board 103, and the wireless communication board 104. Also, a switch for providing a trigger for causing the communication device 1 to forcibly communicate with the server device or an LED display instruction switch for displaying the state of the communication device 1 may be mounted on the signal acquisition board 101. Also, it is desirable to mount the state display LED on this board.

As shown in the right side view of FIG. 6, the rear view of FIG. 7, the left side view of FIG. 8 and the front view of FIG. 9, the bolts 106, 107, and 108 pass through the four boards as described above. Also, as shown in the drawings, a gap of a prescribed length is maintained between the signal acquisition board 101 and the signal conversion board 102, between the signal conversion board 102 and the control board 103, and between the control board 103 and the wireless communication board 104 using spacer nuts. On each board, parts (electronic elements and the like) are disposed, and wiring using printed wiring and the like is provided. That is, each of the signal acquisition board 101, the signal conversion board 102, the control board 103, and the wireless communication board 104 includes an electronic circuit having functions of the signal acquirer 21, the signal converter 22, the controller 23, and the wireless communicator 24. In FIGS. 6 to 9, reference numerals 131, 132, 133, 134 and 135 denote interlayer wiring connectors made of synthetic resins.

Signal lines (not shown) for electrically connecting the layers are provided inside the interlayer wiring connectors 131, 132, 133, 134, and 135. Also, a power supply line may be further provided inside each of the interlayer wiring connectors 131, 132, 133, 134, and 135.

The interlayer wiring connector 131 is provided to accommodate the wiring between the signal acquisition board 101 and the signal conversion board 102.

The interlayer wiring connector 132 is provided to accommodate the wiring between the signal conversion board 102 and the control board 103.

The interlayer wiring connector 133 is provided to accommodate the wiring between the control board 103 and the wireless communication board 104.

The interlayer wiring connector 134 is provided to accommodate the wiring between the signal acquisition board 101 and the signal conversion board 102.

The interlayer wiring connector 135 is provided to accommodate the wiring between the signal conversion board 102 and the control board 103.

Also, the interlayer wiring may be easily attached or detached using a connector or the like.

The interlayer wiring connectors 131, 132, and 133 are provided at the same position on the boards when the communication device 1 is viewed in a plan view. Also, the interlayer wiring connectors 134 and 135 are provided at the same position on the boards when the communication device 1 is viewed in a plan view. Therefore, for example, the signal conversion board 102 of the second layer can be removed so that the interlayer wiring between the signal acquisition board 101 and the control board 103 can be directly connected.

In other words, for example, at least the signal acquisition board 101, the signal conversion board 102, and the control board 103 have the same size when viewed in a plan view. A position of the line of the signal output from the signal acquisition board 101 when the signal acquisition board 101 is viewed in a plan view is the same as a position of the line of the signal output from the signal conversion board 102 when the signal conversion board 102 is viewed in a plan view. Thereby, the communication device can be configured in any state between a state in which the signal conversion board 102 is present and a state in which the signal conversion board 102 is absent.

In this manner, the communication device 1 (see FIG. 1) can be relatively easily changed to the communication device 2 (see FIG. 2) (configuration change). Also, it is easy to manufacture the communication device 1 and the communication device 2 using common parts.

Reference numeral 121 shown in FIGS. 6, 8, and 9 denotes a connector provided on the wireless communication board 104. The data may be output from the wireless communication board 104, or may be input to the wireless communication board 104, via the connector 121.

Also, a port (such as a connector) may be further provided to directly output data from the control board 103 or to directly input data to the control board 103.

Also, the control board 103 is provided with various types of hardware shown in FIG. 4 as well as the CPU 2301.

Also, the input side interface 2303 (FIG. 4) is connected to the wiring accommodated in at least either one of the interlayer wiring connectors 132 and 135 described above.

Also, the wireless transmission/reception side interface 2304 (FIG. 4) is connected to the wiring accommodated in the interlayer wiring connector 133 described above.

The lower surface of the communication device 1, i.e., the rear surface of the wireless communication board 104, is shown in FIG. 10. An integrated circuit and the like for use in wireless communication are provided in the wireless communication board 104. Although the wiring is actually printed on the rear surface of the wireless communication board 104, a wiring diagram is omitted here.

Next, an outline of a circuit mounted on each board constituting the communication device 1 will be described.

FIGS. 11, 12, 13, and 14 are circuit block diagrams showing schematic configurations of circuits on the boards constituting the communication device 1. Also, FIGS. 11, 12, 13, and 14 show functional configurations of the circuits on the boards and do not necessarily show the physical arrangements of circuit blocks on the boards.

Figure 11:
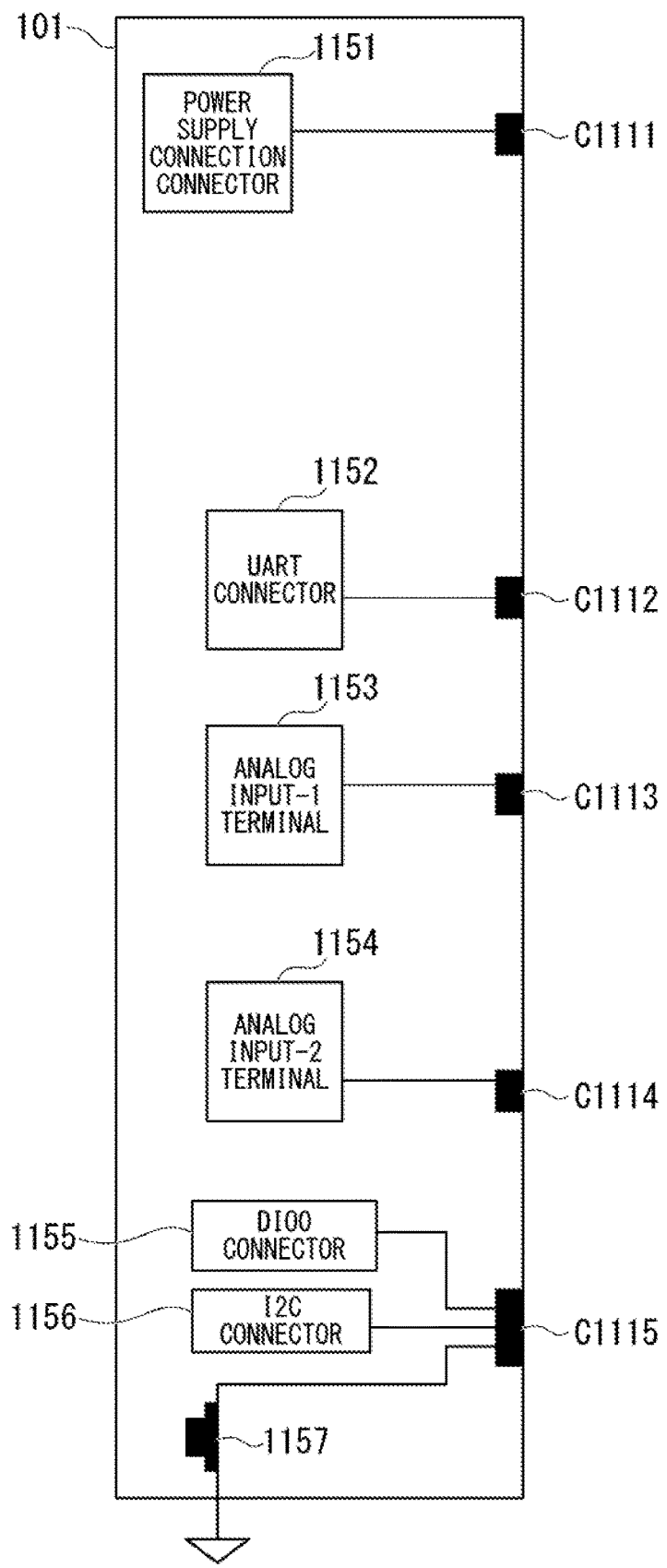
FIG. 11 is a circuit block diagram showing a circuit configuration mounted on a signal acquisition board constituting the communication device according to the first embodiment.

FIG. 11 is a circuit block diagram of the signal acquisition board 101.

Figure 12:
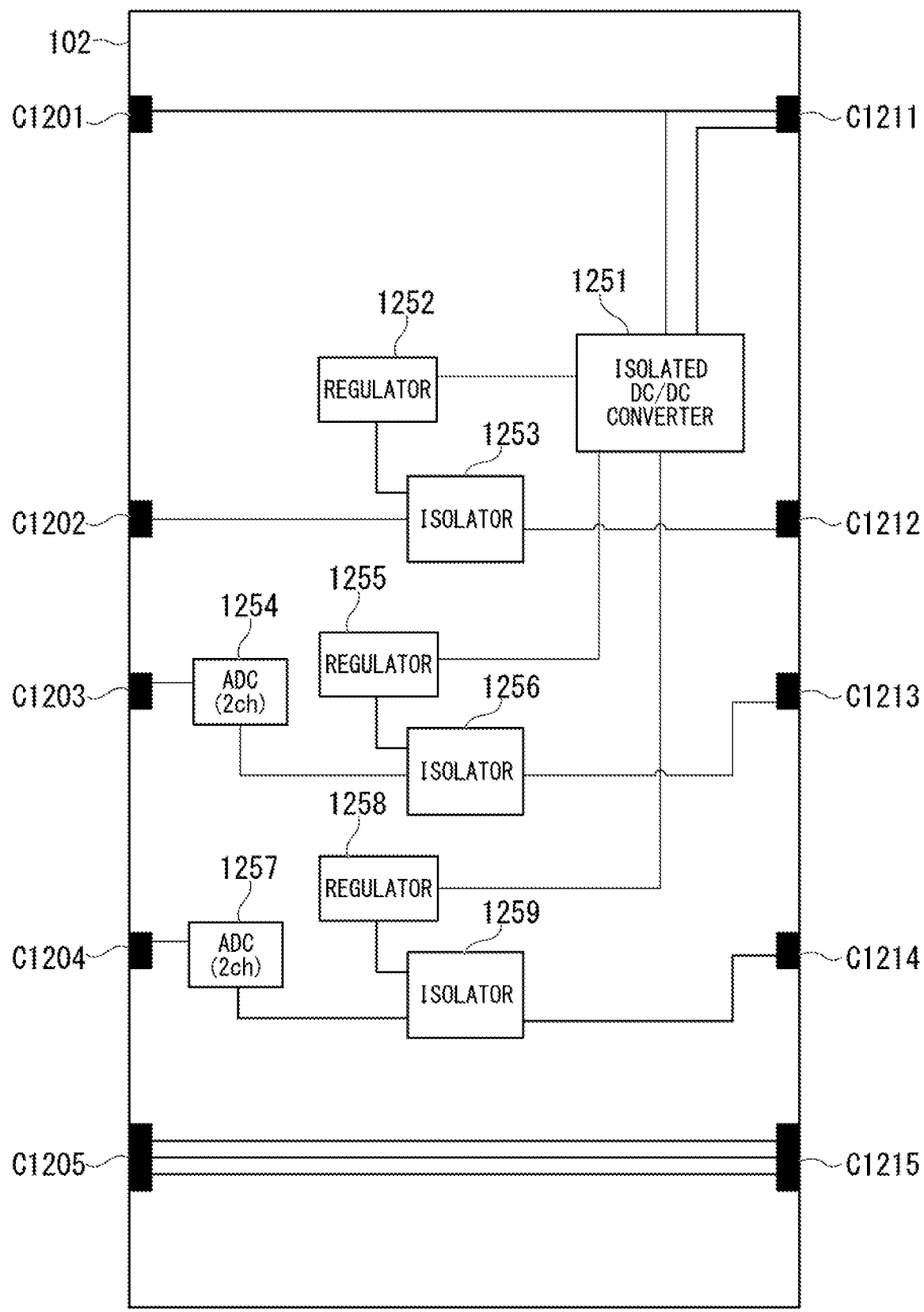
FIG. 12 is a circuit block diagram showing a circuit configuration mounted on a signal conversion board constituting the communication device according to the first embodiment.

FIG. 12 is a circuit block diagram of the signal conversion board 102.

Figure 13:
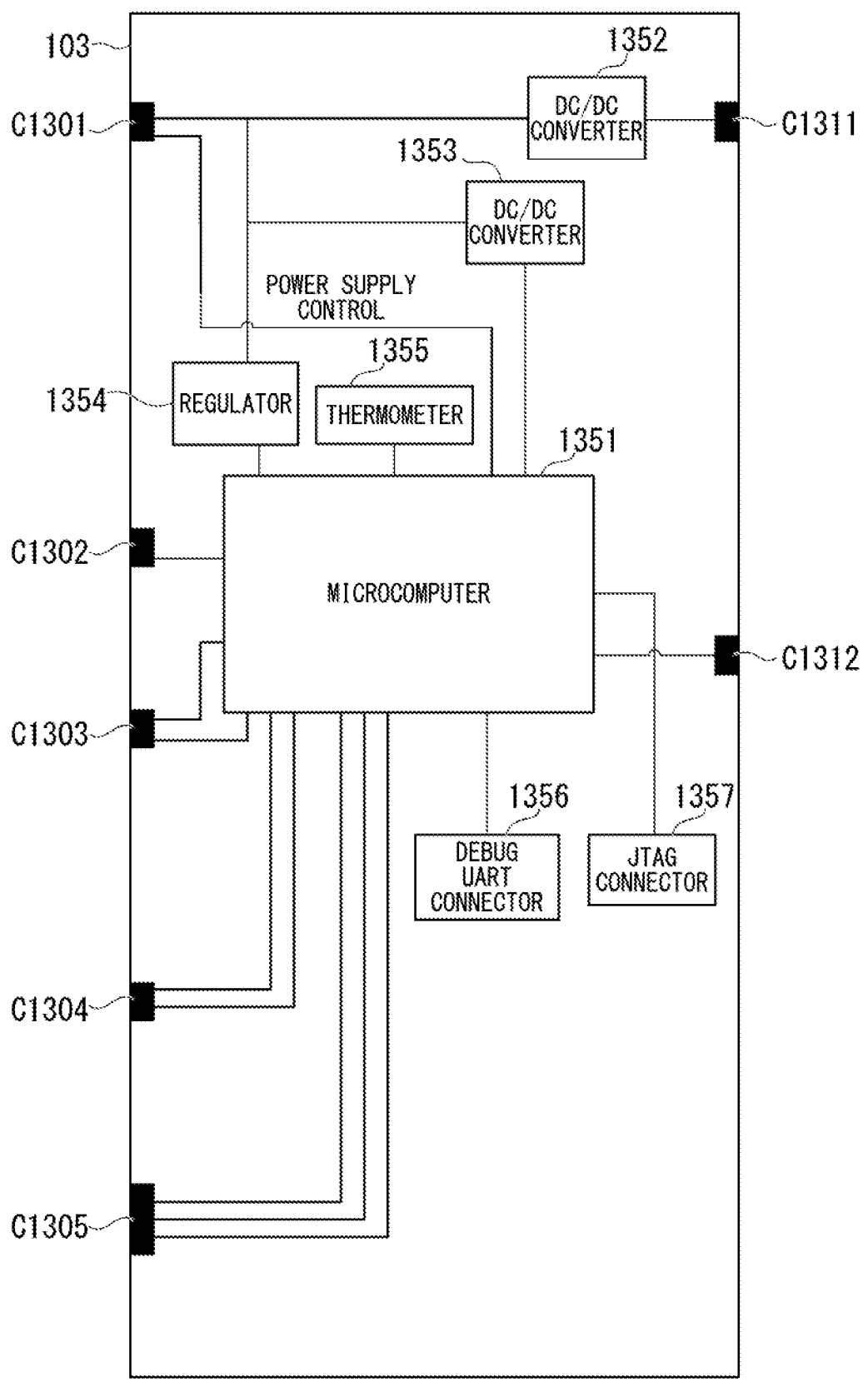
FIG. 13 is a circuit block diagram showing a circuit configuration mounted on a control board of the communication device according to the first embodiment.

FIG. 13 is a circuit block diagram of the control board 103.

Figure 14:
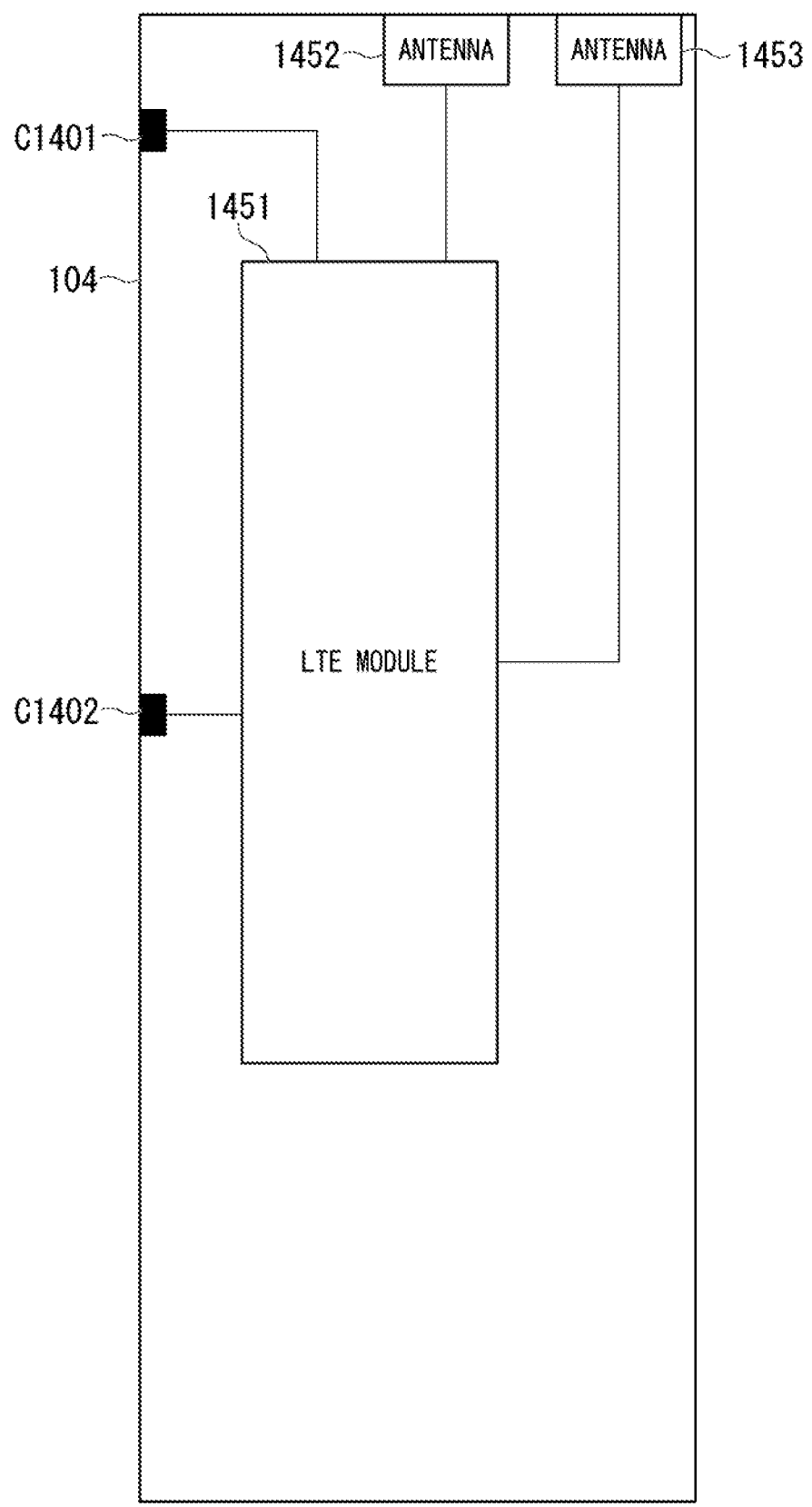
FIG. 14 is a circuit block diagram showing a circuit configuration mounted on a wireless communication board constituting the communication device according to the first embodiment.

FIG. 14 is a circuit block diagram of the wireless communication board 104.

The schematic circuit configuration will be described below with reference to the circuit block diagrams.

Connectors C1111 to C1402 shown in these circuit block diagrams are connectors for interconnecting boards. The interlayer wiring connectors 131, 132, 133, 134, and 135 described above correspond to any one of the connectors C1111 to C1402. However, at least some of a plurality of connectors provided on one board in the circuit block diagram may be collectively replaced with one connector. Thereby, it is also possible to reduce the number of connectors.

In the circuit block diagram, each of the connectors C1111 to C1402 is shown on the edge of the board. Each of the connectors C1111 to C1402 does not need to be necessarily provided on the side of the end of the board when the boards are viewed in a plan view. Each of the connectors C1111 to C1402 can be provided at any position on the board. For example, when each board is viewed in a plan view, if a certain connector is placed at the same position as a connector which is a connection destination of the certain connector, wiring between the corresponding pair of connectors can be minimized or the wiring between the connectors is unnecessary and the connectors can be directly connected.

The communication device 1 includes the signal acquisition board 101, the signal conversion board 102, the control board 103, and the wireless communication board 104. As one form thereof, the communication device 1 may be configured by stacking the signal acquisition board 101, the signal conversion board 102, the control board 103, and the wireless communication board 104 in that order. In this case, the connection relationship between the connectors is as follows.

The connectors C1111, C1112, C1113, C1114, and C1115 of the signal acquisition board 101 are connected to the connectors C1201, C1202, C1203, C1204, and C1205 of the signal conversion board 102, respectively.

The connectors C1211. C1212, C1213, C1214, and C1215 of the signal conversion board 102 are connected to the connectors C1301, C1302, C1303. C1304, and C1305 of the control board 103, respectively.

The connectors C1311 and C1312 of the control board 103 are connected to the connectors C1401 and C1402 of the wireless communication board 104, respectively.

The communication device 2 is a configuration in which the signal conversion board 102 is excluded from the communication device 1. That is, the communication device 2 includes the signal acquisition board 101, the control board 103, and the wireless communication board 104. As one form thereof, the communication device 2 may be configured by stacking the signal acquisition board 101, the control board 103, and the wireless communication board 104 in that order. In this case, a connection relationship between the connectors is as follows.

The connectors C1111, C1112, C1113, C1114, and C1115 of the signal acquisition board 101 are connected to the connectors C1301, C1302, C1303, C1304, and C1305 of the control board 103, respectively.

The connectors C1311 and C1312 of the control board 103 are connected to the connectors C1401 and C1402 of the wireless communication board 104, respectively.

That is, the following can be said on the premise of the above-described connection relationship.

The positions of the connectors C1201, C1202, C1203, C1204, and C1205 of the signal conversion board 102 when the board is viewed in a plan view are the same (or approximately the same) as the positions of the connectors C1301, C1302, C1303, C1304, and C1305 of the control board 103, respectively. Also, the positions of the connectors C1111, C1112, C1113, C1114, and C1115 of the signal acquisition board 101 on the board when the board is viewed in a plan view are the same (or approximately the same) as the positions of the connectors C1211, C1212, C1213, C1214, and C1215 of the signal conversion board 102, respectively.

Thereby, the communication device 1 or the communication device 2 can be easily changed according to whether or not the module of the signal conversion board 102 is included.

The circuit configuration on each board is as follows.

The signal acquisition board 101 shown in FIG. 11 has the above-described connectors C1111 to C1115. Also, the signal acquisition board 101 includes a power supply connection connector 1151, a UART connector 1152, analog input terminals 1153 and 1154, a DIC0 connector 1155, an I2C connector 1156, and an external connector 1157.

The power supply connection connector 1151 is a connector for connecting the communication device according to the present embodiment to a power supply (for example, a battery). The power supply connection connector 1151 is connected to the connector C1111.

The UART connector 1152 is a connector for acquiring an electrical signal from the outside through the interface of the UART. The UART connector 1152 is connected to the connector C1112.

The analog input terminals 1153 and 1154 are connectors for acquiring an analog electrical signal from the outside. The analog input terminals 1153 and 1154 are connected to the connectors C1113 and C1114, respectively.

The DIC0 connector 1155 is a connector for connecting to DIC0 (a surge protection device). The DIC0 connector 1155 is connected to a pin within the connector C1115.

The I2C connector 1156 is a connector for acquiring an electrical signal from the outside through an I2C interface. The I2C connector 1156 is connected to a pin within the connector C1115.

The external connector 1157 is a connector for external electrical connection. The external connector 1157 is connected to a pin within the connector C1115.

The signal conversion board 102 shown in FIG. 12 has the connectors C1201 to C1205 and C1211 to C1215 described above. Also, the signal conversion board 102 includes an isolated direct current (DC)/DC converter 1251, a regulator 1252, an isolator 1253, an analog-to-digital converter (ADC) 1254, a regulator 1255, an isolator 1256, an ADC 1257, a regulator 1258, and an isolator 1259.

Also, the signal conversion board 102 has a signal line for directly connecting the connector C1205 of the input side and the connector C1206 of the output side.

The isolated DC/DC converter 1251 is an isolated DC/DC power supply. The isolated DC/DC converter 1251 supplies power into the signal conversion board 102 through the regulators 1252, 1255, and 1258 described below.

Each of the regulators 1252, 1255, and 1258 is a regulator having a power supply regulation function. Each of the regulators 1252, 1255, and 1258 has a function of converting a voltage or stabilizing a power supply.

Each of the isolators 1253, 1256, and 1259 isolates the input side and the output side of each signal system in the signal conversion board 102 in a DC manner.

Each of the ADCs 1254 and 1257 converts an analog signal of the input side into a digital signal and outputs the digital signal. Each of the ADCs 1254 and 1257 may convert signals of a plurality of channels (for example, two channels).

A signal input from the connector C1202 is output from the connector C1212 via the isolator 1253.

The signal input from the connector C1203 is converted from an analog signal into a digital signal by the ADC 1254 and output from the connector C1213 via the isolator 1256.

The signal input from the connector C1204 is converted from an analog signal into a digital signal by the ADC 1257 and output from the connector C1214 via the isolator 1259.

The control board 103 shown in FIG. 13 has the above-described connectors C1301 to C1305, C1311, and C1312. Also, the control board 103 includes a microcomputer 1351, DC/DC converters 1352 and 1353, a regulator 1354, a thermometer 1355, a debug UART connector 1356, and a program writing joint test action group (JTAG) connector 1357.

The microcomputer 1351 is a computer chip for implementing the control function. The microcomputer 1351 corresponds to the CPU 2301 in FIG. 4. The microcomputer 1351 is configured to have various types of functions written as a program using a stored program scheme. The microcomputer 1351 is connected to signal lines of the connectors C1302, C1303, C1304, and C1305 of the input side. Also, the microcomputer 1351 also has a signal line for exchanging data with an LTE module 1451 to be described below. The microcomputer 1351 exchanges signals with the LTE module 1451 via the connector C1312.

The DC/DC converter 1352 converts the power from the connector C1301 according to DC/DC conversion and supplies the converted power to the wireless communication board 104 via the connector C1311.

The DC/DC converter 1353 converts the power from the connector C1301 according to DC/DC conversion and supplies the convened power to the microcomputer 1351 side.

The regulator 1354 has a function of regulating the power to be supplied to the microcomputer 1351.

The thermometer 1355 has a function of measuring a temperature and supplying a measured value to the microcomputer 1351 as an electrical signal. The above-described temperature measurer 2306 is implemented using the function of the thermometer 1355.

The debug UART connector 1356 is a connector for debugging by the UART.

The program writing JTAG connector 1357 is a connector for writing a program operated by the microcomputer 1351 according to JTAG In FIG. 14, the wireless communication board 104 has the above-described connectors C1401 and C1402 and includes an LTE module 1451, an antenna 1452, and an antenna 1453.

The LTE module 1451 is a chip for implementing wireless communication according to Long Term Evolution (LTE). The LTE module 1451 transmits data transferred from the microcomputer 1351 via the connector C1402 and equally transfers the received data to the microcomputer 1351 via the connector C1402. Also, power is supplied to the LTE module 1451 from the control board 103 side via the connector C1401.

The antennas 1452 and 1453 are antennas used when the LTE module 1451 performs wireless communication.

For example, serial communication is used as communication between the signal conversion board 102 and the control board 103. Also, parallel communication may be used as communication between the signal conversion board 102 and the control board 103.

For example, serial communication is used as communication between the control board 103 and the wireless communication board 104. Also, parallel communication may be used as communication between the control board 103 and the wireless communication board 104.

The signal conversion board 102 includes a connector (referred to as a "first connector" for convenience) for connecting to another board (for example, the signal acquisition board 101 and the control board 103). The above-described other board includes a connector (referred to as a "second connector") for connecting to the signal conversion board 102.

Then, the signal conversion board 102 can be configured as a replaceable module without changing a pin arrangement in the second connector.

When the signal conversion board 102 is configured in this manner, the signal conversion board 102 can be configured as a module capable of being replaced in accordance with its function (signal conversion function). Then, the modules can be exchanged simply by connecting the connectors without changing the pin arrangement in the connectors.

Each of the connectors C1203 and C1204 on the signal conversion board 102 is a connector for inputting an analog signal. Also, each of the connectors C1213 and C1214 is a connector for outputting a digital signal such as an SPI.

When the connectors C1111 to C1115 of the signal acquisition board 101 are directly connected to the connectors C1201 to C1225 of the control board 103 without using the signal conversion board 102, the pins in the connectors are appropriately used according to a type of signal. That is, the position of the wiring (the pin to be used) within the connector is shifted to obtain consistency in relation to the type of signal.

The wireless communication board 104 includes a connector (referred to as a "third connector" for convenience) for connecting to another board (for example, the control board 103). The other board includes a connector (referred to as a "fourth connector") for connecting to the wireless communication board 104. The wireless communication board 104 is configured as a module capable of being replaced in accordance with the wireless communication system without changing the pin arrangement in the fourth connector.

When the wireless communication board 104 is configured in this manner, the wireless communication board 104 can be configured as a module capable of being replaced in accordance with its function (a wireless communication scheme, for example, an LPWA wireless communication scheme, a narrowband LTE wireless communication scheme, or the like). Then, the modules can be replaced simply by connecting the connectors without changing the pin arrangement in the connectors.

The wireless communication board 104 can be replaced with a wired communication board having a function of a wired communicator that externally transmits digital data according to a wired communication scheme based on control performed by the controller, instead of the wireless communicator. Because wireless communication can be replaced with wired communication, the communication device according to the present embodiment can also be configured as a device for wired communication.

As described above, according to the present embodiment, it is possible to easily construct a wireless communication network using field devices that do not have a wireless communication function. This makes it possible to utilize the asset of an existing field device product group (a sensor group). That is, it is possible to provide a communication function in a field device that does not have a wireless communication function.

Also, because long-distance wireless communication can be performed, the construction of a network can be flexibly performed.

Also, it is possible to easily replace a specific module or easily switch the presence or absence of a specific module (for example, a signal converter) by configuring the communication device with a module structure.

Second Embodiment

Next, a second embodiment will be described. The present embodiment is a system using the communication device described in the first embodiment. Also, description of matters already described in the first embodiment may be omitted below. Here, matters specific to the present embodiment will be mainly described.

Figure 15:
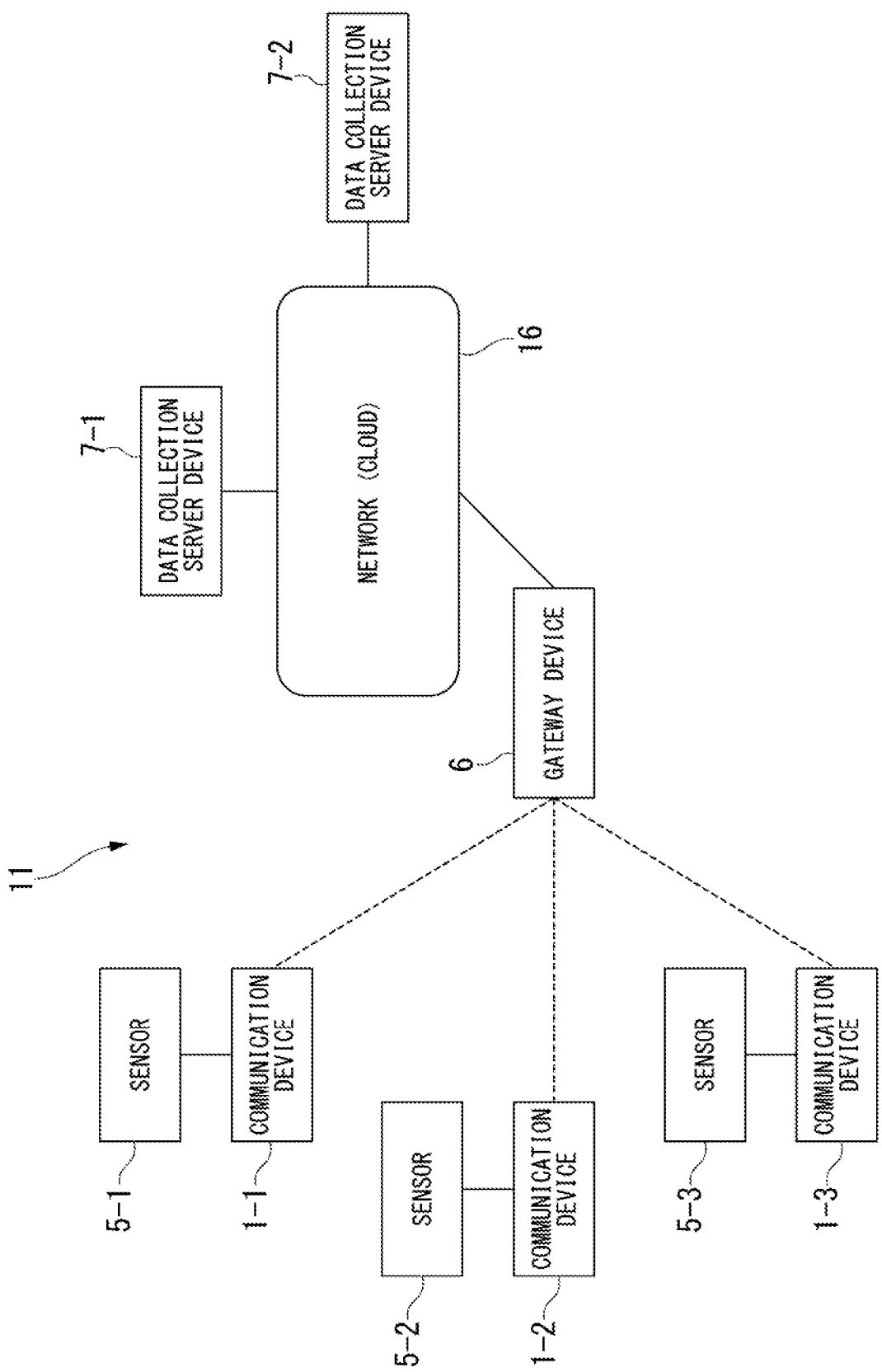
FIG. 15 is a block diagram showing a schematic configuration of a system according to a second embodiment.

FIG. 15 is a block diagram showing a schematic configuration of a system according to the present embodiment. As illustrated, a system 11 is configured by connecting a plurality of communication devices 1-1, 1-2, 1-3, and the like and data collection server devices 7-1 and 7-2 by a network 16. Although three communication devices and two data collection server devices are shown in FIG. 15, the number of communication devices or data collection server devices is arbitrary. Also, the communication devices 1-1, 1-2, 1-3, and the like may be simply referred to as communication devices 1. Also, the data collection server devices 7-1 and 7-2 may be simply referred to as data collection server devices 7.

Also, the system 11 may be configured using the communication device 2 (see FIG. 2 and its description) instead of the communication device 1. In this case, the "communication device 1" in the description of the present embodiment is appropriately replaced with the "communication device 2".

The communication devices 1-1, 1-2, 1-3, and the like are connected to sensors 5-1, 5-2, 5-3, and the like. Specifically, the communication device 1 is connected to the sensor 5 via a connector or the like provided in a signal acquirer 21. Also, the sensor 5 is a field device, and is specifically any one of devices such as a flowmeter, a thermometer, a hygrometer, and a pressure gauge. However, any device capable of being connected to the communication device can be used. The communication device 1 is connected to the network 16 via a gateway device 6 according to wireless communication. Each communication device 1 transmits data to the data collection server device 7 at prescribed time intervals (for example, several tens of seconds, one minute, or the like) based on, for example, settings.

The communication device 1 and the device on the network 16 may directly communicate with each other without involving the gateway device 6.

The gateway device 6 is a device for mediating the communication device 1 side (wireless communication) and the data collection server device 7 side (the network 16). The gateway device 6 mediates communication in both directions. That is, the gateway device 6 receives the data transmitted by the communication device 1 according to wireless communication and retransmits the data to the data collection server device 7 which is a destination. Also, the gateway device 6 receives the data transmitted by the data collection server device 7 to the communication device 1 and retransmits the data to the communication device 1 as a destination according to wireless communication.

Also, the gateway device 6 may mediate control data (for example, an instruction to the communication device 1) transmitted by the data collection server device 7 to the communication device 1. Furthermore, the gateway device 6 may mediate control data (such as a request for the data collection server device 7) to be transmitted by the communication device 1 to the data collection server device 7.

Each of the data collection server devices 7-1 and 7-2 is implemented, for example, using a server computer. The data collection server device 7 is connected to the network 16 and collects and stores data received from the communication device 1 via the network 16. The data collection server device 7 includes a magnetic hard disk device, a storage device using a semiconductor memory, and the like in order to store data.

That is, the data collection server device 7 receives and stores digital data transmitted from the communication device 1. The data collection server device 7 also has a function of displaying data graphically and a function such as a maintenance screen.

Also, the network 16 may be a so-called cloud network. Also, the data collection server device 7 may be implemented using a so-called cloud server.

According to the present embodiment, the communication device 1 can transmit data transferred from the connected sensor 5 to the data collection server device 7 via wireless communication and further via the gateway device 6. Thereby, the data collection server device 7 can collect data detected by (a large number of) sensors 5. Also, various control data can be transmitted and received between the communication device 1 and the data collection server device 7. Also, wireless communication between the communication device 1 and the gateway device 6 enables data transmission of a long distance such as several kilometers to be performed without a relay device, and is implemented with low power consumption. That is, it is possible to construct a system in a wide range of plants and the like without installing a large number of relay devices and the like. That is, it is possible to construct a low-cost and flexible system by reducing the number of relay devices.

Third Embodiment

Next, a third embodiment will be described. The present embodiment is a system using the communication device described in the first embodiment.

Figure 16:
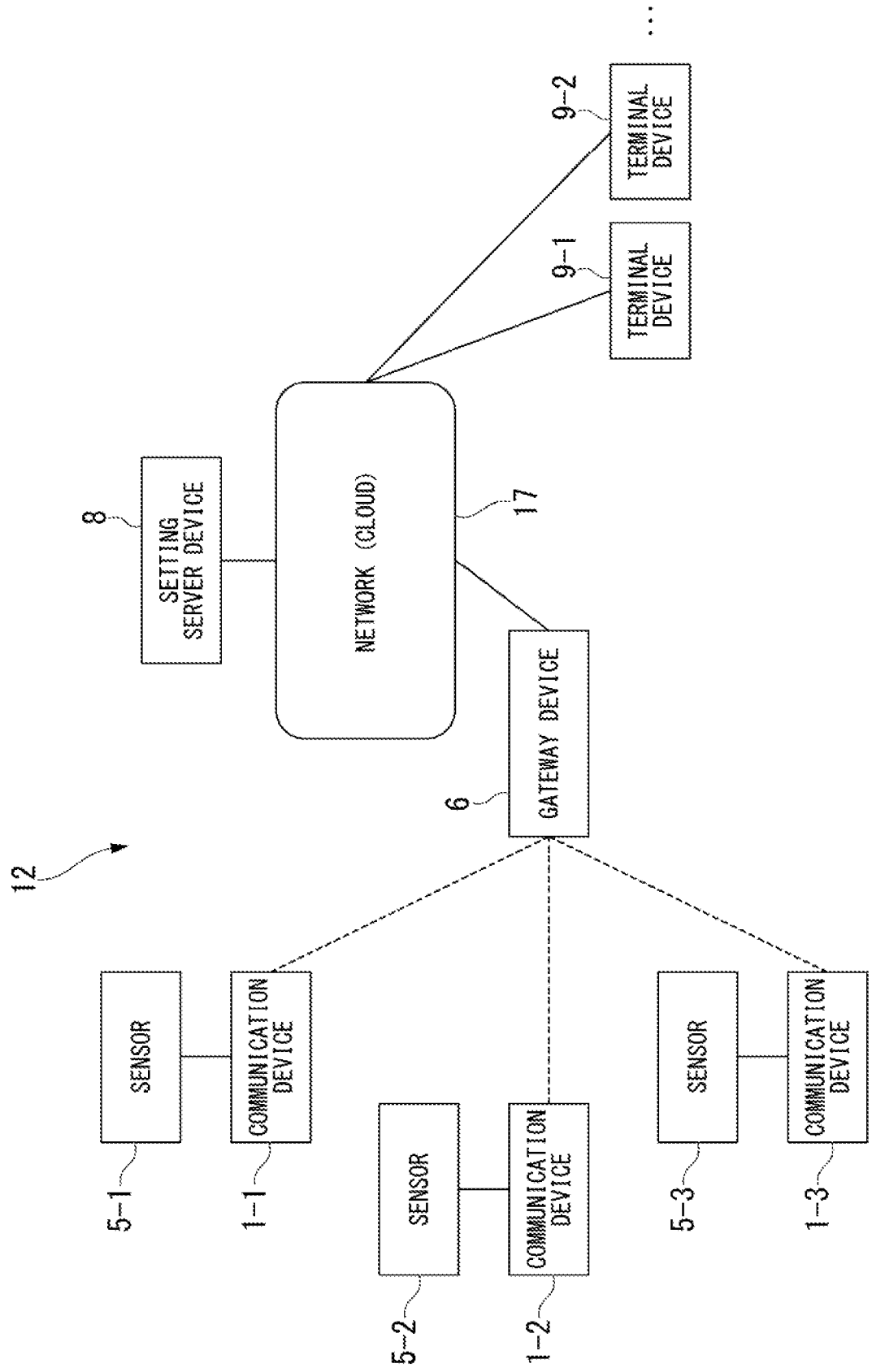
FIG. 16 is a block diagram showing a schematic configuration of a system according to a third embodiment.

FIG. 16 is a block diagram showing a schematic configuration of a system according to the present embodiment. As illustrated, a system 12 is configured by connecting a plurality of communication devices 1-1, 1-2, 1-3, and the like, a setting server device 8, and terminal devices 9-1, 9-2, and the like by a network 17. Although three communication devices, one setting server device, and two terminal devices are shown in FIG. 16, the number of communication devices, the number of setting server devices, or the number of terminal devices is arbitrary.

The terminal devices 9-1, 9-2, and the like may be simply referred to as terminal devices 9.

Also, the system 12 may be configured using the communication device 2 (see FIG. 2 and its description) instead of the communication device 1. In this case, the "communication device 1" in the description of the present embodiment is appropriately replaced with the "communication device 2".

As in the second embodiment, the communication devices 1-1, 1-2, 1-3, and the like are connected to the sensors 5-1, 5-2, 5-3, and the like. The communication device 1 is connected to the network 17 via the gateway device 6 according to wireless communication.

The gateway device 6 has a function similar to the function described in the second embodiment. In the present embodiment, the gateway device 6 is a device for mediating the communication device 1 side (wireless communication) and the setting server device 8 side (the network 17). The gateway device 6 mediates communication in both directions. That is, the gateway device 6 receives the data transmitted by the communication device 1 according to wireless communication and retransmits the data to the setting server device 8 that is the destination. Also, the gateway device 6 receives the data transmitted to the communication device 1 by the setting server device 8 and retransmits the data to the communication device 1 that is the destination according to wireless communication. Data transmitted and received between the communication device 1 and the setting server device 8 is, for example, control data for setting the communication device 1 individually.

The setting server device 8 is implemented, for example, using a server computer. The setting server device 8 is connected to the network 17 and communicates with the communication device 1 via the network 17. The main function of the setting server device 8 is to individually set the communication devices 1. Also, the setting server device 8 can also communicate with the terminal device 9 via the network 17.

The terminal device 9 is implemented using, for example, a desktop PC, a notebook PC, a tablet terminal, a smartphone, a wearable terminal, or the like. The terminal device 9 has a user interface function using, for example, a liquid crystal display screen, a touch panel, or the like. The terminal device 9 presents information provided from the setting server device 8 to a user (for example, an administrator of a chemical plant or the like provided with a large number of communication devices 1) via the user interface. Also, the terminal device 9 acquires information of an operation from the user (for example, information for setting the communication device 1) via the user interface. The terminal device 9 functions as a client of the setting server device 8 and transmits setting information and the like from the above-described user to the setting server device 8. Also, the setting server device 8 may be integrated with the data collection server device 7.

As in the second embodiment, the network 17 may be a so-called cloud network. Also, the setting server device 8 may be implemented using a so-called cloud server.

FIG. 17 is a schematic view showing an example of a configuration of a communication device setting screen displayed on a display device provided in the terminal device 9 in the present embodiment. As illustrated, the communication device setting screen includes a communication device identification information field and a type field and a numeric value range field for each channel.

The communication device identification information field is a field for displaying or inputting information for identifying each communication device 1.

The type field and the numeric value range field for each channel are fields for displaying or inputting the type and the numeric value range of data for each channel of the communication device 1. These fields may be collectively called a numeric value range setting field. Also, for example, a user interface capable of being selected from a pull-down menu is used in relation to the "type".

In the illustrated example, "P001R234D456" is displayed as the communication device identification information. Also, the type "temperature" is selected in relation to channel 1 and the lower limit "−20" and the upper limit "80" are displayed as the range. Also, the type "pressure" is selected in relation to channel 2 and the lower limit "0" and the upper limit "1,000,000" are displayed as the range. Also, the type "flow rate" is selected in relation to channel 3 and the lower limit "0" and the upper limit "1,000" are displayed as the range. Also, the number of channels to be processed by the communication device 1 is not limited to three and is arbitrary.

The setting server device 8 transmits information of a communication device setting screen to the terminal device 9. The terminal device 9 receiving the information displays the communication device setting screen. Also, the user of the terminal device 9 can set each communication device 1 using the communication device setting screen.

When the identification information is input to the communication device identification information field, the setting information of the communication device 1 corresponding to the identification information is displayed in the numeric value range setting field. Also, the setting of the corresponding communication device 1 is changed by updating the data (the type and the numeric value range) in the numeric value range setting field. Specifically, when the data for changing the setting is updated in the communication device setting screen displayed on the terminal device 9, the information of the change is transmitted from the terminal device 9 to the setting server device 8. Also, in response thereto, the setting server device 8 instructs the corresponding communication device 1 to change the setting.

For example, when the communication device 1 is driven by a battery, data is transmitted from the communication device 1 at a predetermined clock time according to a program incorporated in the controller in order to reduce power consumption.

Rewriting of the setting value from the setting server device 8 to the communication device 1 is performed only at this timing, but the switch is provided in the communication device 1 in order to enable rewriting of the setting value from the setting server device 8 at any clock time. That is, when the switch is operated, it is possible to cause the communication device 1 to forcibly access the setting server device 8 also at a clock time other than a predetermined clock time.

As described above, setting server device 8 instructs communication device 1 to change the setting of communication device 1. As a specific example, the setting server device 8 issues an instruction for changing the setting of the type of physical quantity and the numeric value range of numeric values represented by the signal for each channel of the signal in relation to the numeric value conversion process in the communication device 1.

According to the present embodiment, the setting server device 8 transmits setting data to the communication device 1 based on an operation of the user of the terminal device 9 or the like. Thereby, for example, it is possible to appropriately set the communication device 1 that functions as a component of a chemical plant or the like. Also in the present embodiment, wireless communication between the communication device 1 and the gateway device 6 can enable data transmission of a long distance such as several kilometers to be performed without a relay device and can be implemented with low power consumption. That is, it is possible to construct a system in a wide range of plants and the like at a low cost and with flexibility without installing a large number of relay devices and the like.

Combination of Plurality of Embodiments

Any of the plurality of embodiments described above may be appropriately combined.

For example, a system in which both the data collection server device 7 and the setting server device 8 are provided on the network may be implemented by combining the second embodiment and the third embodiment.

[Implementation Using Computer and Program]

Also, at least some functions of the communication device, the data collection server device, the setting server device, the terminal device, and the gateway device described in the above-described embodiments can be implemented by a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a compact disc (CD)-ROM, a digital versatile disc (DVD)-ROM, a portable medium such as a universal serial bus (USB) memory, and a hard disk embedded in the computer system. Further, the "computer-readable recording medium" may include a computer-readable recording medium for temporarily dynamically holding a program as in a communication line when the program is transmitted via a network such as the Internet or a communication circuit such as a telephone circuit and a computer-readable recording medium for holding the program for a fixed time as in a volatile memory inside the computer system including a server and a client when the program is transmitted. The above-described program may be used to implement some of the above-described functions. Further, the program may implement the above-described functions in combination with a program already recorded on the computer system.

[Supplementary Note]

[1] There is provided a communication device, which may include a signal acquirer having terminals for a plurality of types of interfaces for acquiring signals from an external field device, a controller configured to acquire the signals output from the signal acquirer, and configured to perform control for externally transmitting digital data based on the signals using wireless communication, a wireless communicator configured to externally transmit the digital data in accordance with a wireless communication scheme based on the control performed by the controller, a signal acquisition board having a function of the signal acquirer, a control board having a function of the controller, and a wireless communication board having a function of the wireless communicator.

According to this configuration, it is possible to transmit digital data based on a signal output by a field device, which has no wireless communication function, according to wireless communication. Also, each of the signal acquisition board having the function of the signal acquirer, the control board having the function of the controller, and the wireless communication board having the function of the wireless communicator can be implemented as a module with high independence.

[2] Also, according to an aspect of the present invention, in the above-described communication device, the signal acquisition board, the control board, and the wireless communication board may be stacked in that order.

According to this configuration, it is possible to implement the communication device with a compact size while modularizing the function of each board. Here, the size of the communication device is, for example, a sum of a length, a width, and a height of the communication device.

[3] Also, according to an aspect of the present invention, the above-described communication device may further include a signal converter configured to convert the signals output by the signal acquirer into digital signals having a type in conformity with a prescribed communication standard, and configured to output the digital signals, wherein the controller is configured to acquire the digital signals output from the signal converter as signals output from the signal acquirer, and wherein the communication device further includes a signal conversion board having a function of the signal converter in addition to the signal acquisition board, the control board, and the wireless communication board.

According to this configuration, it is possible to supply a signal to the controller as a digital signal conforming to a prescribed communication standard. Also, the signal conversion board having a function of the signal converter can be implemented as a module with high independence.

[4] Also, according to an aspect of the present invention, in the above-described communication device, the signal acquisition board, the signal conversion board, the control board, and the wireless communication board may be stacked in that order.

According to this configuration, it is possible to implement the communication device with a compact size while modularizing the function of each board. Here, the size of the communication device is, for example, a sum of a length, a width, and a height of the communication device.

[5] Also, according to an aspect of the present invention, in the above-described communication device, the signal converter may be configured as a module capable of being replaced according to the communication standard.

According to this configuration, it is possible to easily configure a device according to various communication standards simply by replacing a module in accordance with the adopted communication standard.

[6] Also, according to an aspect of the present invention, in the above-described communication device, communication between the signal conversion board and the control board may be serial communication.

According to this configuration, communication for transferring a signal from the signal conversion board to the control board can be performed according to serial communication.

[7] Also, according to an aspect of the present invention, in the above-described communication device, communication between the control board and the wireless communication board may be serial communication.

According to this configuration, communication between the control board and the wireless communication board can be performed according to serial communication.

[8] Also, according to an aspect of the present invention, in the above-described communication device, the signal conversion board may include a first connector for establishing a connection to another board, the other board may include a second connector for establishing a connection to the signal conversion board, and the signal conversion board may be configured as a module capable of being replaced without changing a pin arrangement in the second connector.

Also, according to this configuration, the signal conversion board can be replaced. Also, signal conversion boards according to a plurality of signal conversion systems can be implemented and the signal conversion boards incorporated in the communication device can be provided as replaceable modules. It becomes possible to easily implement a communication device according to the required function by replacing a module.

[9] Also, according to an aspect of the present invention, in the above-described communication device, the wireless communication board may include a third connector for establishing a connection to another board, the other board may include a fourth connector for establishing a connection to the wireless communication board, and the wireless communication board may be configured as a module capable of being replaced in accordance with the wireless communication scheme without changing a pin arrangement in the fourth connector.

According to this configuration, it is possible to replace the wireless communication board. Also, wireless communication boards according to a plurality of wireless communication schemes can be implemented and the wireless communication board incorporated in the communication device can be provided as a replaceable module. It becomes possible to easily implement a communication device according to a required function by replacing a module.

[10] Also, according to an aspect of the present invention, in the above-described communication device, the wireless communication board may be replaceable with a wired communication board having a function of a wired communicator configured to externally transmit the digital data according to a wired communication scheme based on control performed by the controller instead of the wireless communicator.

According to this configuration, it is possible to replace data transmission based on wireless communication with wired communication.

[11] Also, according to an aspect of the present invention, the above-described communication device ([3] or [4]) may function as a communication device even if the signal conversion board is removed.

According to this configuration, it is possible to configure a communication device to or from which the signal conversion board can be attached or detached.

[12] Also, according to an aspect of the present invention, in the above-described communication device, the controller may include a numeric value converter configured to convert the acquired signals into digital data of a prescribed numeric value range, and the controller may be configured to perform control for externally transmitting the digital data after conversion performed by the numeric value converter using the wireless communication.

According to this configuration, it is possible to convert the signal output from the field device into an appropriate physical quantity or the like. By performing numeric value conversion on the communication device side, for example, it is not necessary to perform processing such as numeric value conversion on the server device side where data is collected.

[13] Also, according to an aspect of the present invention, in the above-described communication device, the controller may include a storage which stores backup of digital data to be externally transmitted using wireless communication, and a data backup section configured to manage the backup of the digital data.

According to this configuration, it is possible to store generated data in the storage, for example, even in a situation where a failure of wireless communication or the like occurs. Then, in a situation where transmission based on wireless communication has become possible, it is possible to externally retransmit data stored as backup.

[14] Also, according to an aspect of the present invention, in the above-described communication device, the signal acquisition board, the signal conversion board, and the control board may have the same size in a plan view, and a position of a line of a signal to be output from the signal acquisition board when the signal acquisition board is viewed in a plan view may be the same as a position of a line of a signal to be output from the signal conversion board when the signal conversion board is viewed in a plan view.

According to this configuration, even when the communication device is configured by stacking the remaining signal acquisition board, control board, and wireless communication board other than the signal conversion board, the position of the line of the signal output from the signal acquisition board exactly matches the position of the line of the signal output from the signal conversion board. That is, the control board can easily take in the output signal from the signal acquisition board instead of the signal conversion board.

[15] Also, according to an aspect of the present invention, in the above-described communication device, the wireless communicator may externally transmit the digital data in accordance with a low power wide area (LPWA) wireless communication scheme or a narrowband Long Term Evolution (LTE) wireless communication scheme.

According to this configuration, it is possible to configure a communication device using the LPWA wireless communication scheme or the narrowband LTE wireless communication scheme. Thereby, a low power consumption communication device can be configured.

[16] Also, according to an aspect of the present invention, in the above-described communication device, the control board may include a memory which stores a program, and a processor configured to execute the program stored in memory.

According to this configuration, it is possible to implement each function of the present invention by cooperation of hardware with software.

[17] Also, according to an aspect of the present invention, in the above-described communication device, the control board may further include a temperature measurer configured to measure a temperature of a portion where the controller is provided, and configured to supply a signal representing a measurement value of the temperature to the processor.

According to this configuration, the communication device can grasp a heating state of the control board.

[18] Also, according to an aspect of the present invention, in the above-described communication device, the controller may further include a temperature monitor configured to monitor whether or not the measurement value of the temperature measured by the temperature measurer is in a range of normal values, and configured to externally transmit a warning signal when the measurement value of the temperature is out of the range of normal values.

According to this configuration, when an abnormal heating has occurred in the control board, the communication device can notify the outside of the occurrence of the abnormal heating.

[19] Also, according to an aspect of the present invention, there is provided a system which may include the communication device according to any one of the above-described [1] to [18], and a data collection server device configured to receive and store the digital data transmitted from the communication device.

According to this configuration, it is possible to construct a wireless communication network, and the data collection server device can collect and store digital data from the communication device. At this time, the number of communication devices may be arbitrary and large.

[20] Also, according to an aspect of the present invention, there is provided a system which may include the communication device according to the above-described [12], and a setting server device configured to instruct the communication device to change a setting of the prescribed numeric value range in a process of the numeric value converter in the communication device.

According to this configuration, the setting server device can perform the setting related to the numeric value conversion process (the setting related to the physical amount, the setting of the numeric value range, and the like) in the communication device.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:
1. A communication device comprising:
a signal acquisition board having terminals for a plurality of types of interfaces for acquiring signals from an external field device;
a control board configured to acquire the signals output from the signal acquisition board, and configured to perform control for externally transmitting digital data based on the signals using wireless communication; and
a wireless communication board configured to externally transmit the digital data in accordance with a wireless communication scheme based on the control performed by the control board,
wherein the signal acquisition board, the control board, and the wireless communication board are stacked, and
wherein the wireless communication board is replaceable with a wired communication board having a function of a wired communicator configured to externally transmit the digital data according to a wired communication scheme based on control performed by the control board instead of the wireless communication board.

2. The communication device according to claim 1, wherein the signal acquisition board, the control board, and the wireless communication board are stacked in that order from the top.

3. The communication device according to claim 1, further comprising:
a signal conversion board configured to convert the signals output by the signal acquisition board into digital signals having a type in conformity with a prescribed communication standard, and configured to output the digital signals,
wherein the control board is configured to acquire the digital signals output from the signal conversion board as signals output from the signal acquisition board.

4. The communication device according to claim 3, wherein the signal acquisition board, the signal conversion board, the control board, and the wireless communication board are stacked in that order.

5. The communication device according to claim 4, wherein the signal acquisition board, the signal conversion board, and the control board have the same size in a plan view, and
wherein a position of a line of a signal to be output from the signal acquisition board when the signal acquisition board is viewed in a plan view is the same as a position of a line of a signal to be output from the signal conversion board when the signal conversion board is viewed in a plan view.

6. The communication device according to claim 3,
wherein the signal conversion board is configured as a module capable of being replaced according to the communication standard.
7. The communication device according to claim 6,
wherein the signal conversion board comprises a first connector for establishing a connection to another board,
wherein the other board comprises a second connector for establishing a connection to the signal conversion board, and
wherein the signal conversion board is configured as a module capable of being replaced without changing a pin arrangement in the second connector.
8. The communication device according to claim 3,
wherein communication between the signal conversion board and the control board is serial communication.
9. The communication device according to claim 3,
wherein the communication device functions as a communication device even if the signal conversion board is removed.
10. The communication device according to claim 1,
wherein communication between the control board and the wireless communication board is serial communication.
11. The communication device according to claim 1,
wherein the wireless communication board comprises a first connector for establishing a connection to another board,
wherein the other board comprises a second connector for establishing a connection to the wireless communication board, and
wherein the wireless communication board is configured as a module capable of being replaced in accordance with the wireless communication scheme without changing a pin arrangement in the second connector.
12. The communication device according to claim 1,
wherein the control board comprises a numeric value converter configured to convert the acquired signals into digital data of a prescribed numeric value range, and
wherein the control board is configured to perform control for externally transmitting the digital data after conversion performed by the numeric value converter using the wireless communication.
13. A system comprising:
the communication device according to claim 12; and
a setting server device configured to instruct the communication device to change a setting of the prescribed numeric value range in a process of the numeric value converter in the communication device.
14. The communication device according to claim 1,
wherein the control board comprises:
a storage which stores backup of digital data to be externally transmitted using wireless communication; and
a data backup section configured to manage the backup of the digital data.
15. The communication device according to claim 1,
wherein the wireless communication board externally transmits the digital data in accordance with a low power wide area (LPWA) wireless communication scheme or a narrowband Long Term Evolution (LTE) wireless communication scheme.
16. The communication device according to claim 1,
wherein the control board comprises:
a memory which stores a program; and
a processor configured to execute the program stored in memory.
17. The communication device according to claim 16,
wherein the control board further comprises:
a temperature measurer configured to measure a temperature of a portion where the control board is provided, and configured to supply a signal representing a measurement value of the temperature to the processor.
18. The communication device according to claim 17,
wherein the control board further comprises:
a temperature monitor configured to monitor whether or not the measurement value of the temperature measured by the temperature measurer is in a range of normal values, and configured to externally transmit a warning signal when the measurement value of the temperature is out of the range of normal values.
19. A system comprising:
the communication device according to claim 1; and
a data collection server device configured to receive and store the digital data transmitted from the communication device.
20. A communication device comprising:
a signal acquisition board having terminals for a plurality of types of interfaces for acquiring signals from an external field device;
a control board configured to acquire the signals output from the signal acquisition board, and configured to perform control for externally transmitting digital data based on the signals using wireless communication; and
a wireless communication board configured to externally transmit the digital data in accordance with a wireless communication scheme based on the control performed by the control board,
wherein the signal acquisition board, the control board, and the wireless communication board are stacked,
wherein the wireless communication board comprises a first connector for establishing a connection to another board,
wherein the other board comprises a second connector for establishing a connection to the wireless communication board, and
wherein the wireless communication board is configured as a module capable of being replaced in accordance with the wireless communication scheme without changing a pin arrangement in the second connector.
21. A communication device comprising:
a signal acquisition board having terminals for a plurality of types of interfaces for acquiring signals from an external field device;
a control board configured to acquire the signals output from the signal acquisition board, and configured to perform control for externally transmitting digital data based on the signals using wireless communication; and
a wireless communication board configured to externally transmit the digital data in accordance with a wireless communication scheme based on the control performed by the control board,
wherein the signal acquisition board, the control board, and the wireless communication board are stacked,
wherein the communication device further comprises a signal conversion board configured to convert the signals output by the signal acquisition board into digital signals having a type in conformity with a prescribed communication standard, and configured to output the digital signals, wherein the control board is configured to acquire the digital signals output from the signal conversion board as signals output from the signal acquisition board, wherein the signal conversion board is configured as a module capable of being replaced according to the communication standard, wherein the signal conversion board comprises a first connector for establishing a connection to another board, wherein the other board comprises a second connector for establishing a connection to the signal conversion board, and wherein the signal conversion board is configured as a module capable of being replaced without changing a pin arrangement in the second connector.

22. A communication device comprising:

a signal acquisition board having terminals for a plurality of types of interfaces for acquiring signals from an external field device;

a control board configured to acquire the signals output from the signal acquisition board, and configured to perform control for externally transmitting digital data based on the signals using wireless communication; and a wireless communication board configured to externally transmit the digital data in accordance with a wireless communication scheme based on the control performed by the control board, wherein the signal acquisition board, the control board, and the wireless communication board are stacked, wherein the communication device further comprises a signal conversion board configured to convert the signals output by the signal acquisition board into digital signals having a type in conformity with a prescribed communication standard, and configured to output the digital signals, wherein the control board is configured to acquire the digital signals output from the signal conversion board as signals output from the signal acquisition board, wherein the signal acquisition board, the signal conversion board, the control board, and the wireless communication board are stacked in that order, wherein the signal acquisition board, the signal conversion board, and the control board have the same size in a plan view, and wherein a position of a line of a signal to be output from the signal acquisition board when the signal acquisition board is viewed in a plan view is the same as a position of a line of a signal to be output from the signal conversion board when the signal conversion board is viewed in a plan view.

* * * * *